(12) United States Patent
Miura et al.

(10) Patent No.: US 10,351,093 B2
(45) Date of Patent: Jul. 16, 2019

(54) AIRBAG

(71) Applicant: TOYODA GOSEI CO., LTD., Kiyosu-shi, Aichi-ken (JP)

(72) Inventors: Wataru Miura, Kiyosu (JP); Keiichiro Takebayashi, Kiyosu (JP); Shota Watanabe, Kiyosu (JP); Daisuke Kitamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 93 days.

(21) Appl. No.: 15/785,767

(22) Filed: Oct. 17, 2017

(65) Prior Publication Data

US 2018/0050655 A1 Feb. 22, 2018

Related U.S. Application Data

(62) Division of application No. 14/755,470, filed on Jun. 30, 2015, now Pat. No. 9,821,750.

(30) Foreign Application Priority Data

Jul. 11, 2014 (JP) ................................ 2014-143533

(51) Int. Cl.
  *B60R 21/205* (2011.01)
  *B60R 21/206* (2011.01)
  (Continued)

(52) U.S. Cl.
  CPC .......... *B60R 21/233* (2013.01); *B60R 21/237* (2013.01); *B60R 21/205* (2013.01);
  (Continued)

(58) Field of Classification Search
  CPC ... B60R 21/206; B60R 21/237; B60R 21/205; B60R 21/233; B60R 2021/23169; B60R 2021/23308; B60R 2021/23316
  See application file for complete search history.

(56) References Cited

U.S. PATENT DOCUMENTS 5,496,061 A 3/1996 Brown
5,785,350 A 7/1998 Inoue et al.
(Continued)

FOREIGN PATENT DOCUMENTS

DE 197 31 729 A1 1/1998
DE 696 21 278 T2 1/2003
(Continued)

OTHER PUBLICATIONS

Office Action dated Jan. 8, 2018 issued in corresponding DE patent application No. 10 2015 008 801.7 (and English translation).

*Primary Examiner* — Laura Freedman
(74) *Attorney, Agent, or Firm* — Posz Law Group, PLC

(57) ABSTRACT

An airbag includes a mounting region, a protection inflatable region and an intermediate region disposed between the mounting region and the protection inflatable region. An area of the airbag from the protection inflatable region to the intermediate region is formed of two panels that are continuous with each other at leading end regions of the panels apart from the mounting region and the two panels in that area are connected at opposite edges by a joint. The protection inflatable region includes at the leading end a folded region that is formed by bringing the leading end regions of the two panels closer to the mounting region so as to form four or more layers of the panels, such that the folded region includes at least two inflatable spaces between the layers and a crease that is continuous with the joint.

7 Claims, 36 Drawing Sheets

(51) Int. Cl.
   *B60R 21/231* (2011.01)
   *B60R 21/233* (2006.01)
   *B60R 21/237* (2006.01)

(52) U.S. Cl.
   CPC ... *B60R 21/206* (2013.01); *B60R 2021/23169* (2013.01); *B60R 2021/23308* (2013.01)

(56) References Cited

U.S. PATENT DOCUMENTS

| | | | |
|---|---|---|---|
| 5,913,535 A * | 6/1999 | Taguchi | B60R 21/2346 280/729 |
| 6,176,509 B1 | 1/2001 | Kawaguchi et al. | |
| 6,371,518 B1 | 4/2002 | Kalandek et al. | |
| 6,398,258 B2 | 6/2002 | Hamada et al. | |
| 6,631,923 B2 | 10/2003 | Eckert et al. | |
| 7,152,878 B2 | 12/2006 | Kai | |
| 7,185,913 B2 | 3/2007 | Bakhsh et al. | |
| 7,201,396 B2 | 4/2007 | Takimoto et al. | |
| 7,314,230 B2 | 1/2008 | Kumagai et al. | |
| 7,350,811 B2 | 4/2008 | Sato | |
| 7,455,317 B2 | 11/2008 | Bito | |
| 7,611,164 B2 | 11/2009 | Kai et al. | |
| 7,766,376 B2 | 8/2010 | Yokoyama | |
| 8,297,649 B2 | 10/2012 | Enders | |
| 8,485,553 B1 | 7/2013 | Kuhne et al. | |
| 8,523,223 B2 | 9/2013 | Miyata | |
| 8,540,277 B2 | 9/2013 | Miyata | |
| 8,622,417 B1 | 1/2014 | Schneider et al. | |
| 8,628,111 B2 | 1/2014 | Sugimoto et al. | |
| 8,746,738 B2 | 6/2014 | Matsui | |
| 8,840,134 B2 | 9/2014 | Lechelt et al. | |
| 8,905,433 B2 | 12/2014 | Scott et al. | |
| 9,085,279 B2 | 7/2015 | Fukawatase et al. | |
| 9,821,750 B2 * | 11/2017 | Miura | B60R 21/233 |
| 2004/0113399 A1 | 6/2004 | Yoshikawa et al. | |
| 2004/0174003 A1 | 9/2004 | Dominissini | |
| 2006/0220359 A1 | 10/2006 | Sato | |
| 2013/0082457 A1 | 4/2013 | Hashido et al. | |

FOREIGN PATENT DOCUMENTS

| | | |
|---|---|---|
| DE | 601 12 252 T2 | 4/2006 |
| DE | 102012018450 A1 | 3/2014 |
| EP | 179 456 A2 | 2/2002 |
| JP | 2000-085516 A | 3/2000 |
| JP | 2002-019560 A | 1/2002 |
| JP | 2003-160016 A | 6/2003 |
| JP | 2013-075599 A | 4/2013 |
| JP | 2014-043184 A | 3/2014 |

* cited by examiner

US 10,351,093 B2

AIRBAG

CROSS REFERENCE TO RELATED APPLICATIONS

The Present application is a divisional of U.S. patent application Ser. No. 14/755,470 filed on Jun. 30, 2015, which is based upon and claims priority from Japanese Patent Application No. 2014-143533 of Miura et. al., filed on Jul. 11, 2014, the disclosure of which is hereby incorporated into the present application by reference.

BACKGROUND OF THE INVENTION

1. Field of the Invention

The present invention relates to an airbag which is formed of a flexible sheet member into a bag shape inflatable with inflation gas and adapted to be housed in a housing in a folded-up configuration. Particularly, the invention relates to an airbag including a mounting region to be mounted on the housing and a protection inflatable region deployable towards an object of protection and apart from the housing.

2. Description of Related Art

JP2002-19560 A discloses an airbag including a mounting region and a protection inflatable region. The airbag is adapted to be housed in a folded-up configuration in a housing disposed inside an instrument panel in front of a front passenger seat. The mounting region of the airbag has a reduced thickness in order to reduce the volume of the airbag, such that, at deployment, a void space is formed between the mounting region and a windshield disposed above the instrument panel while the protection inflatable region inflates thick enough to contact the windshield.

The airbag of the above-mentioned reference includes a partition wall which partitions an interior of the airbag and regulates an outer contour of the airbag so as to inflate the protection inflatable region in a thick fashion while inflate the mounting region in a thin fashion. However, this configuration complicates the manufacturing of the airbag, and therefore, has a room for improvement in convenience in manufacturing and in better control of an airbag contour at deployment.

SUMMARY OF THE INVENTION

An object of the present invention is to provide an airbag which has a simple configuration and is easy to control the contour at deployment.

The airbag of the invention is inflatable with inflation gas and adapted to be housed in a housing in a folded-up configuration and the airbag includes:
  a mounting region adapted to be attached to the housing;
  a protection inflatable region disposed at a leading end of the airbag apart from the mounting region and being deployable towards an object of protection;
  an intermediate region disposed between the mounting region and the protection inflatable region;
  two panels that forms at least an area of the airbag from the protection inflatable region to the intermediate region, the two panels being continuous with each other at leading end regions of the panels apart from the mounting region;
  a joint that connects opposite edges of the two panels in an overlapping state together in the area of the airbag from the protection inflatable region to the intermediate region; and
  a folded region disposed at a leading end of the protection inflatable region, the folded region being formed by bringing the leading end regions of the two panels in a flattened and overlapping state closer to the mounting region in such a manner as to reduce a length of the airbag from the mounting region, such that four or more layers of the panels are formed in a sectional shape of a region of the folded region from a root end brought closer to the mounting region and a leading end apart from the mounting region taken along an overlapping direction of the layers, the folded region including at least two inflatable spaces between the layers of the panels and a crease that is continuous with the joint.

When the airbag of the invention inflates with an inflation gas, the protection inflatable region will inflate while unfolding the creases in the folded region located at the leading end apart from the mounting region in such a manner as to inflate the inflatable spaces. Since the folded region includes the creases which continue to the joint formed at the opposite edges of the panels, when fed with an inflation gas, the protection inflatable region will inflate in a thick fashion in such a manner as to unfold and open up the folded region with the opposite edges in the folded region regulated by the joint. Moreover, in the airbag of the invention, since the protection inflatable region has a greater substantial film length by the amount of the folded region, the protection inflatable region will inflate thicker than the mounting region and intermediate region. Further, the airbag of the invention can be manufactured simply by jointing the edges of the two panels, in other words, by a planar jointing work. Therefore, in a simple fashion without a complicated three-dimensional jointing work, the airbag can be manufactured such that the protection inflatable region inflates thicker than the mounting region and intermediate region.

Therefore, the airbag of the invention has a simple configuration and easy to control the contour at deployment.

With the airbag of the invention, moreover, the protection inflatable region for protecting an object of protection is inflatable thick whereas the intermediate region and mounting region are inflatable thinner relatively. This configuration will contribute to reduce the volume of the airbag while maintaining an adequate protection property of the object of protection, and further help reduce the output of an inflator for feeding an inflation gas to the airbag.

The airbag of the invention includes in the intermediate region a seam region that partially connects the two panels in such a manner as to bring the panels into contact with each other. Such a seam region will help keep the intermediate region thin at airbag deployment and let the protection inflatable region inflate thick, thus further increasing the difference in thickness between the protection inflatable region and remaining regions at airbag deployment.

The airbag may include three or more of the inflatable spaces. With this configuration, the protection inflatable region will inflate further thick and the difference in thickness between the protection inflatable region and the remaining regions will be further increased.

More specifically, if the airbag includes in the folded region an outfold region which is formed by placing the leading end regions of the two panels before forming the folded region on an outside of one of the two panels, at airbag deployment, the outfold region will not deploy in such a manner as to pull away from the mounting region, but will deploy in such a manner as to protrude toward an outside of the panel. The airbag may also include in the folded region an infold region which is formed by invaginating the leading end regions of the two panels before forming the folded region between the two panels. At airbag deployment, the infold region will deploy in such a manner as to draw away from the mounting region while pulling the two panels apart from each other. Thus, by selectively providing such an outfold region and/or such an infold region in the folded region, the contour of the airbag at deployment can be appropriately changed with a simple planar jointing work.

In the airbag described above, it is desired that the folded region includes an infold region which is formed by invaginating the leading end regions of the two panels before forming the folded region between the two panels, and that the seam region includes an extended region that connects a part of the infold region to the two panels which are opposed to each other.

With this configuration, at airbag deployment, the leading end of the infold region, which faces towards the mounting region, will be prevented from protruding towards an object of protection (or in a direction drawing away from the mounting region) since it is coupled to the intermediate region by the extended region of the seam region. Accordingly, the protection inflatable region will be prevented from protruding considerably towards the object of protection and will inflate in such a flat fashion as to widen its plane facing toward the object of protection. As a consequence, the airbag will secure a wide area for protecting the object of protection in an adequate fashion. Moreover, this configuration will also help prevent the protection inflatable region from inflating in an unduly thick fashion, in other words, help increase a thin area, thereby reducing the volume of the airbag while keeping an adequate protection property of the object of protection.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

An airbag 15 as the first embodiment of the invention is for use in an airbag device S1 for a front passenger seat.

Figure 1:
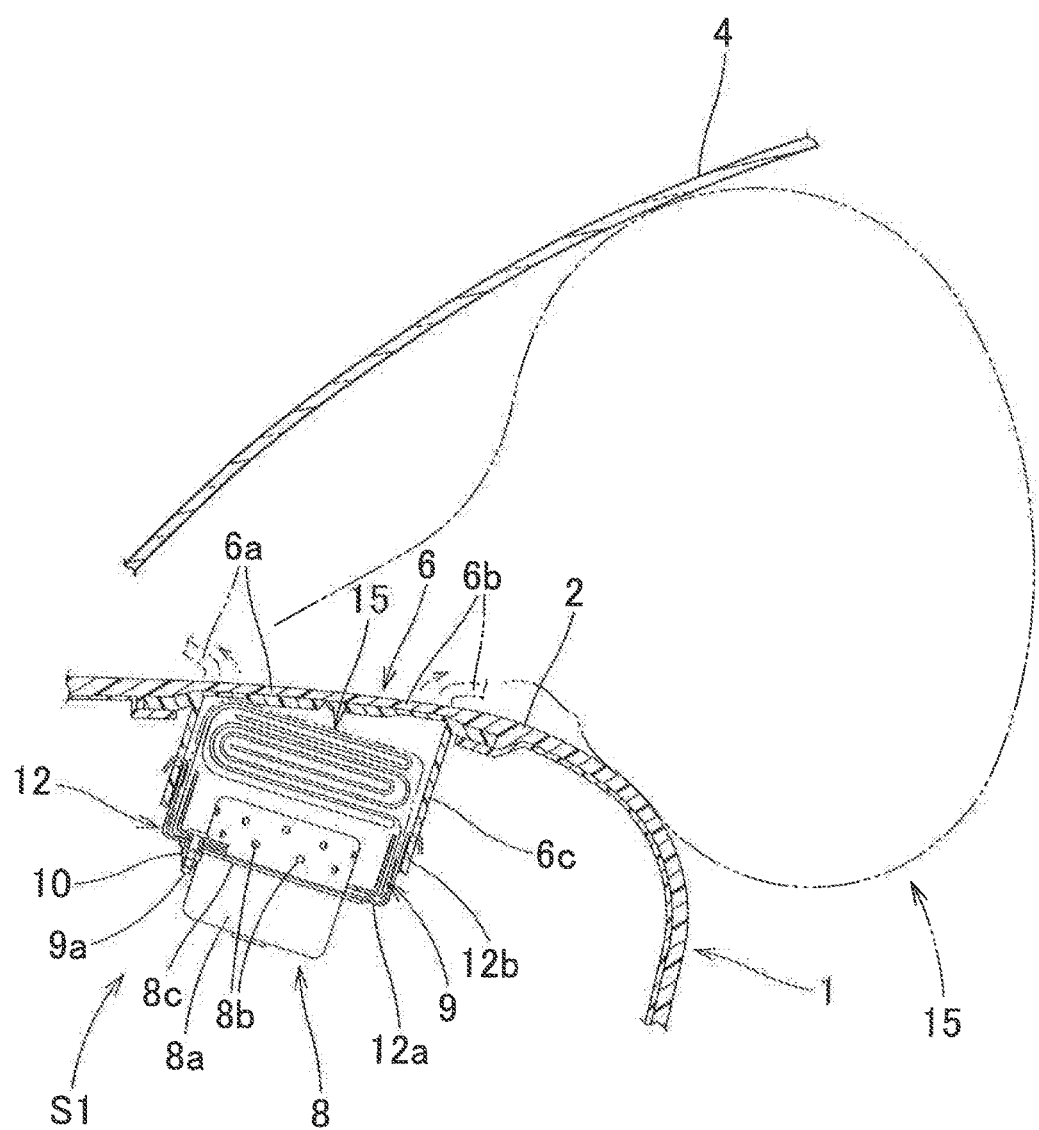
FIG. 1 is a schematic vertical section of an airbag device for a front passenger seat employing an airbag according to the first embodiment of the invention as mounted on a vehicle.

As shown in FIG. 1, the airbag device S1 is mounted on an instrument panel or dashboard 1 disposed in front of a front passenger seat (not shown) for protecting an occupant (i.e., an object of protection) seated in the front passenger seat. The airbag device S1 is a top-mount airbag device mounted inside a top plane 2 of the dashboard 1.

As shown in FIG. 1, the airbag device S1 includes an airbag 15, which is folded up, an inflator 8 for supplying the airbag 15 with an inflation gas, a case or housing 12 for housing and holding the airbag 15 and inflator 8, a retainer 9 for attaching the airbag 15 and inflator 8 to the case 12 and an airbag cover 6 for covering the airbag 15 from above.

The airbag cover 6 is integral with the dashboard 1 formed from synthetic resin and includes two doors, i.e. front and rear doors 6a and 6b configured to open when pushed by the airbag 15 upon airbag deployment. The airbag cover 6 further includes around the doors 6a and 6b a joint wall 6c, which is coupled to the case 12.

The inflator 8 includes a main body 8a that is generally columnar in shape and provided with gas discharge ports 8b, and a flange 8c for attachment to the case 12.

The case (housing) 12 is made of sheet metal into a generally rectangular parallelepiped shape having a generally rectangular opening at the top. The case 12 includes a generally rectangular bottom wall 12a to which the inflator 8 is inserted and mounted from below and a circumferential wall 12b extending upward from the outer edge of the bottom wall 12a and retaining the joint wall 6c of the airbag cover 6. The airbag 15 and inflator 8 are attached to the bottom wall 12a of the case 12 by locating the retainer 9 inside the airbag 15 such that the bolts 9a go through the periphery of a gas inlet port 17 of the airbag 15, setting the airbag 15 in the case 12 such that the bolts go through the bottom wall 12a of the case 12 and flange 8c of the inflator 8 and by fastening the bolts 9a with nuts 10. Further, unillustrated brackets are provided on the bottom wall 12a for joint with a vehicle body structure.

Figure 2:
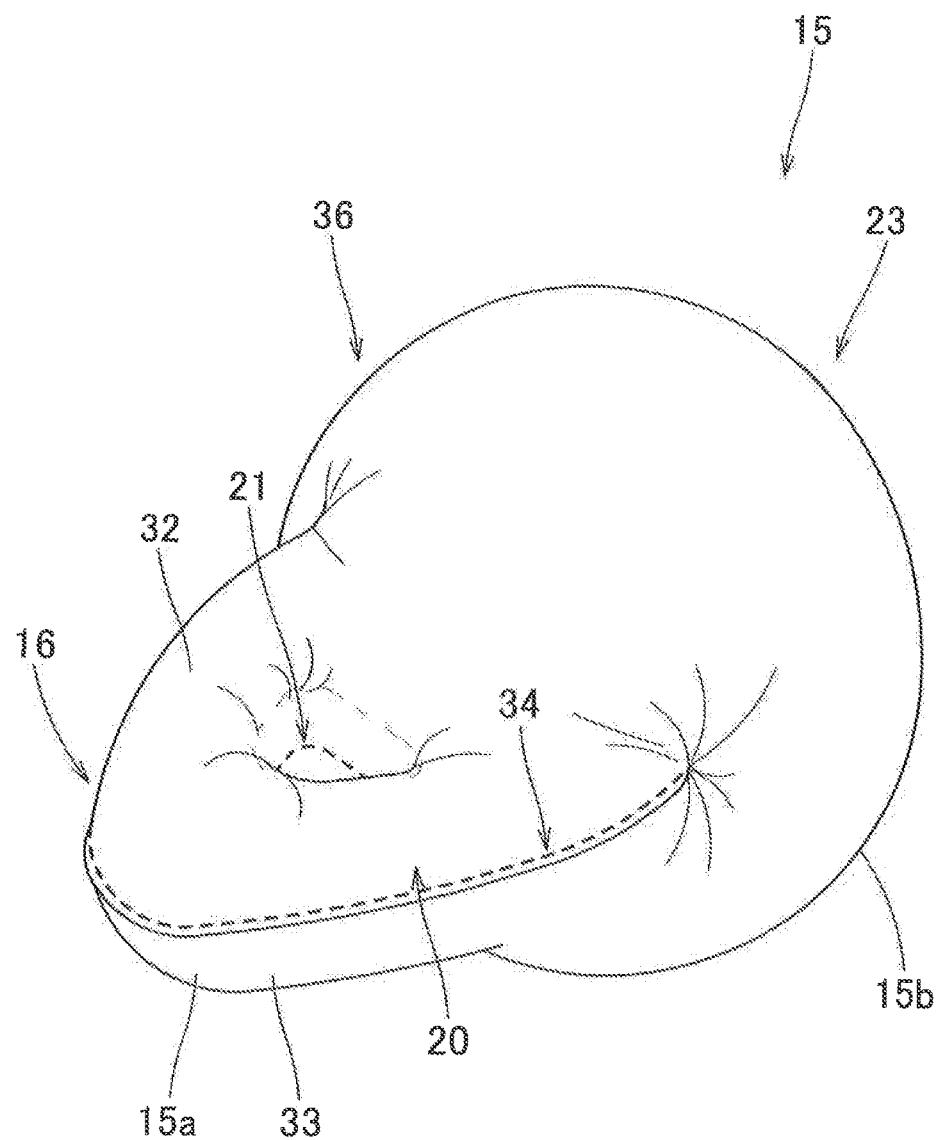
FIG. 2 is a schematic perspective view of the airbag of the first embodiment as inflated by itself and viewed from the front.
Figure 3:
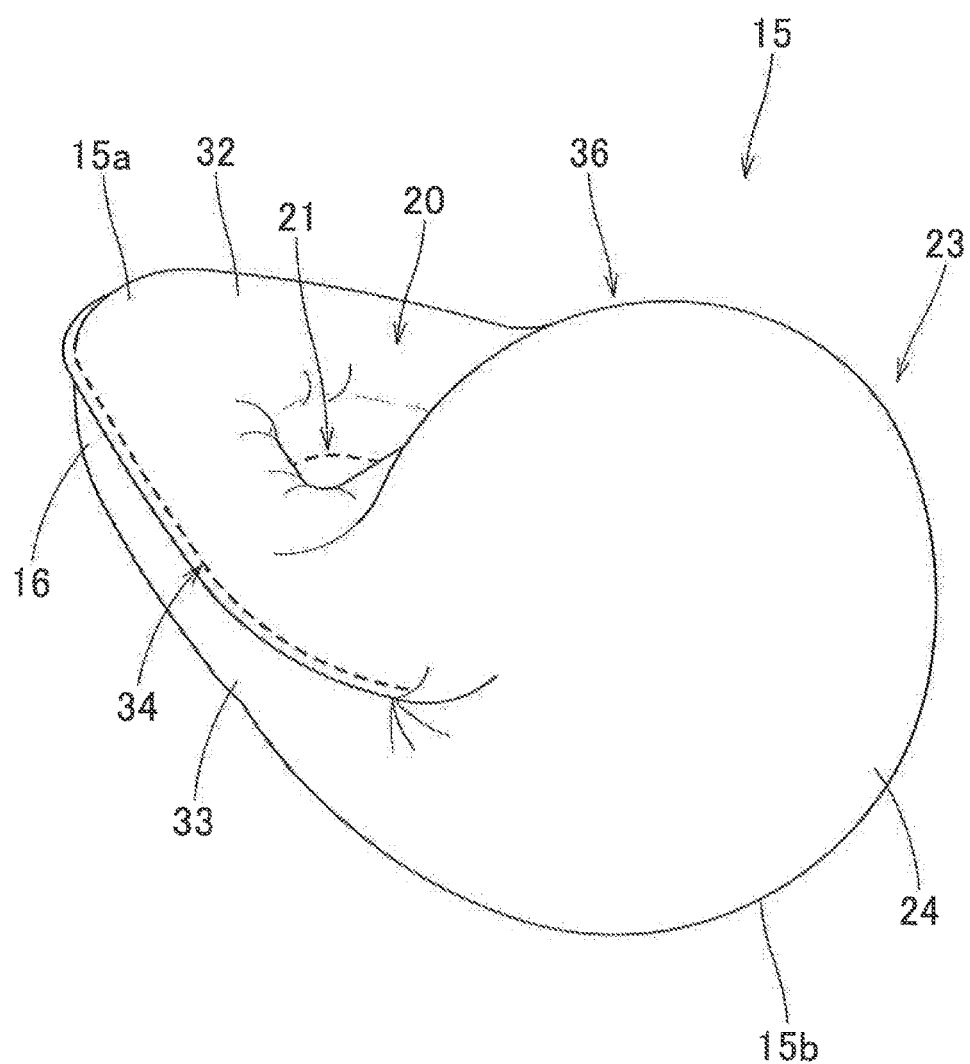
FIG. 3 is a schematic perspective view of the airbag of the first embodiment as inflated by itself and viewed from the rear.
Figure 4:
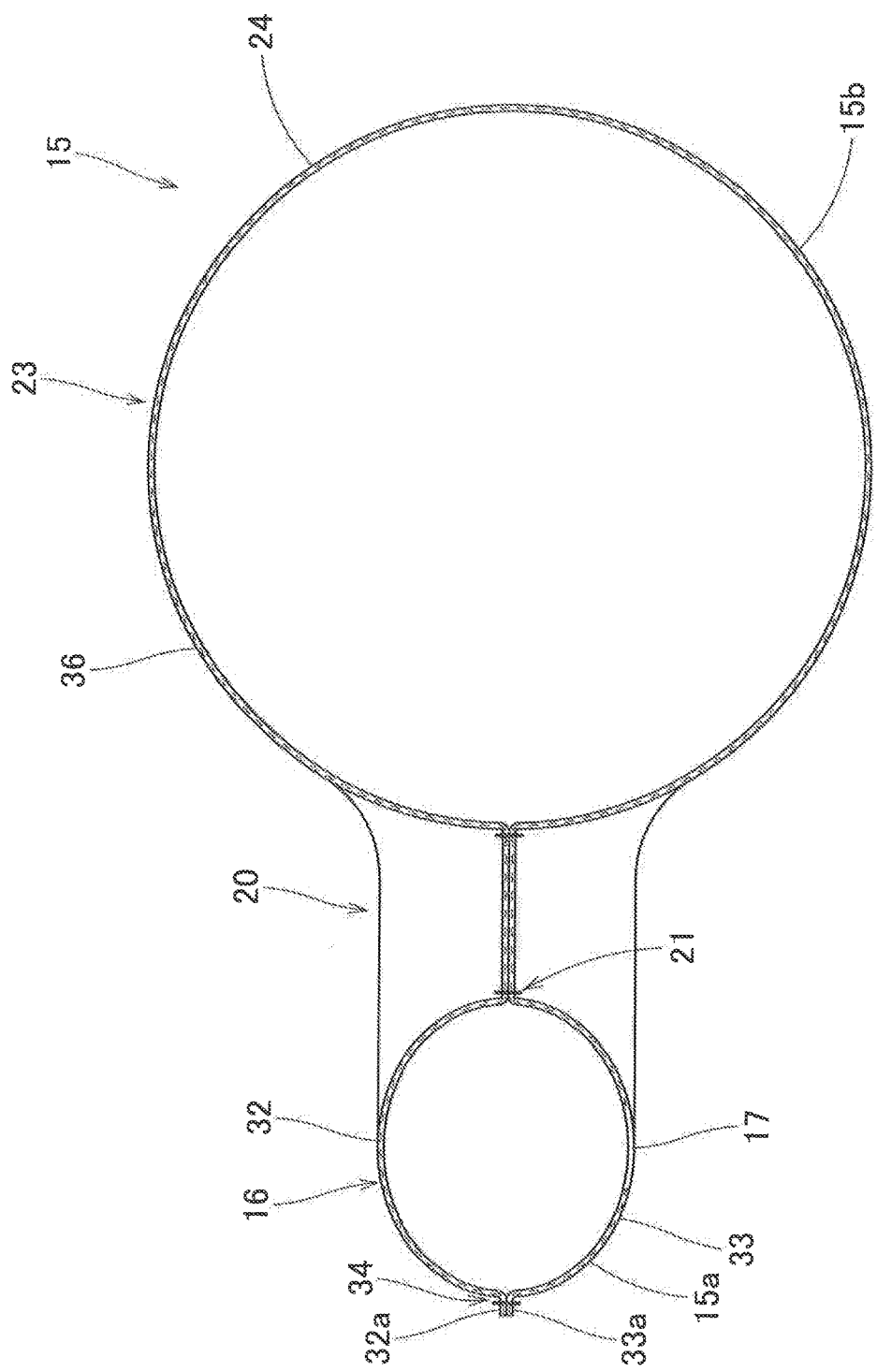
FIG. 4 is a schematic vertical section of the airbag of the first embodiment as inflated by itself.
Figure 5:
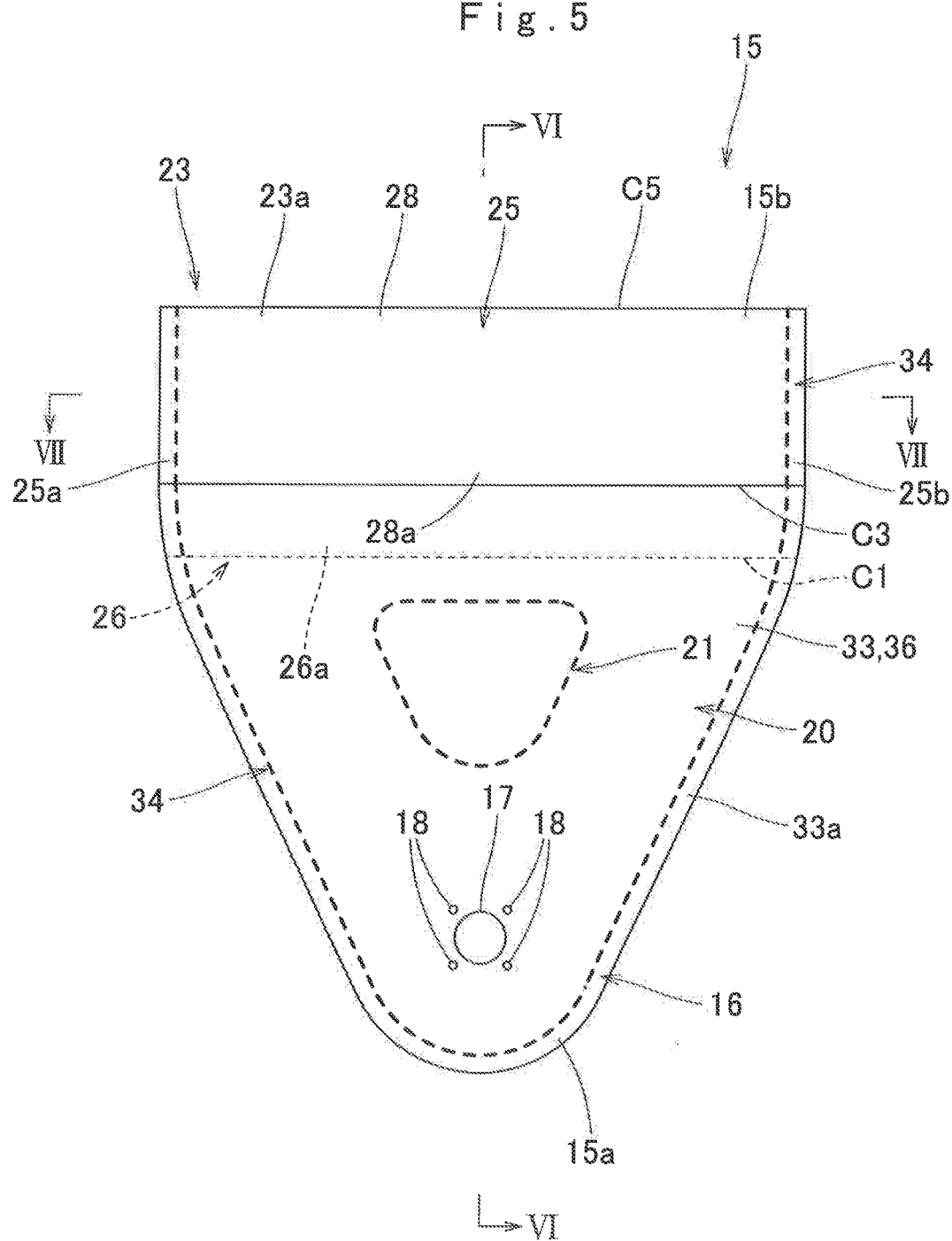
FIG. 5 is a bottom view of the airbag of the first embodiment as flattened and spread out such that an upper panel and a lower panel overlap each other.

Referring to FIGS. 2 to 4, the airbag 15 includes a mounting region 16 that is located at the front end 15a of the airbag 15 at deployment and mounted on the case 12, a protection inflatable region 23 that is located at the leading end (i.e., at the rear end 15b) and deployable apart from the case 12 and towards an occupant, and an intermediate region 20 that is disposed between the mounting region 16 and protection inflatable region 23. The mounting region 16 is provided, on the underside at deployment (i.e., on a later-described lower panel 33), with a generally circular gas inlet port 17 (FIG. 4) for taking in an inflation gas. As shown in FIG. 5, a plurality of (four, in the illustrated embodiment) mounting holes 18 are formed in the periphery of the gas inlet port 17 for receiving the bolts 9a of the retainer 9 to mount the periphery of the gas inlet port 17 on the bottom wall 12a of the case 12.

As shown in FIG. 4, the intermediate region 20 includes a seam region 21 that is formed by partially connecting later-described upper panel 32 and lower panel 33 in such a manner as to bring the panels 32 and 33 into contact with each other. In the illustrated embodiment, the seam region 21 is formed by sewing the upper panel 32 and lower panel 33 together by sewing threads. As shown in FIG. 5, the seam region 21 is formed into such a generally triangle that enlarges toward the protection inflatable region 23, in other words, such a generally triangle that the vertex faces toward the mounting region 16 while the base faces toward the protection inflatable region 23, when the airbag 15 so flattened and spread out that the upper panel 32 and lower panel 33 are laid one over the other is viewed from an up and down direction. Corners of the seam region 21 are chamfered and rounded in order to avoid stress concentration upon airbag deployment.

Figure 12:
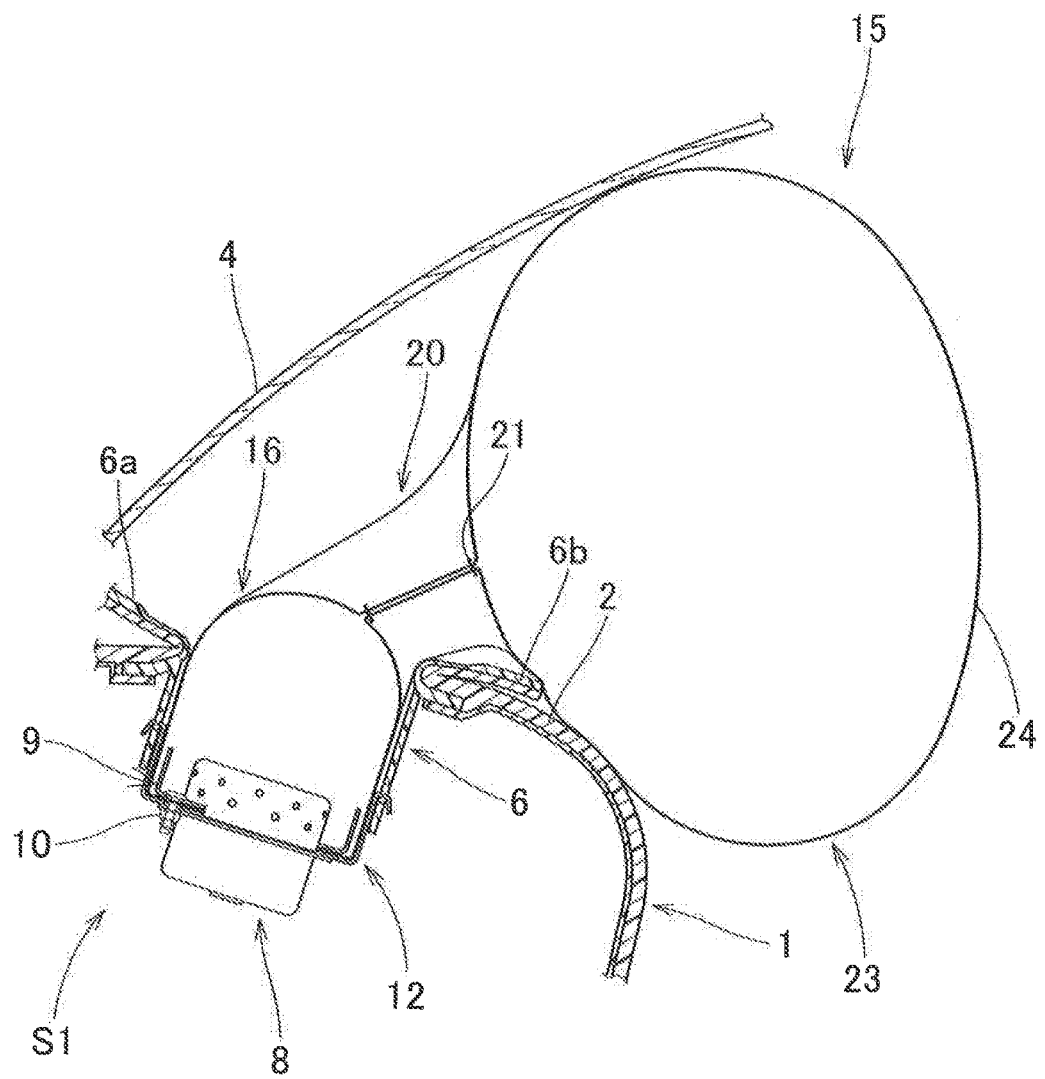
FIG. 12 is a schematic vertical section of the airbag device for a front passenger seat employing the airbag of the first embodiment as fully deployed.

As shown in FIG. 4, the protection inflatable region 23 is inflatable into a generally round shape thicker than the mounting region 16 and intermediate region 20, in vertical sectional shape as taken along a front and rear direction. The width in a left and right direction of the protection inflatable region 23 as inflated is also greater than those of the mounting region 16 and intermediate region 20, as shown in FIGS. 2 and 3. The region of the protection inflatable region 23 deployable at the rear side in a generally half circular sectional shape serves as an occupant protection plane 24. The protection inflatable region 23 is so configured as to contact with the windshield 4 by the upper end at deployment as shown in FIG. 12.

Figure 8:
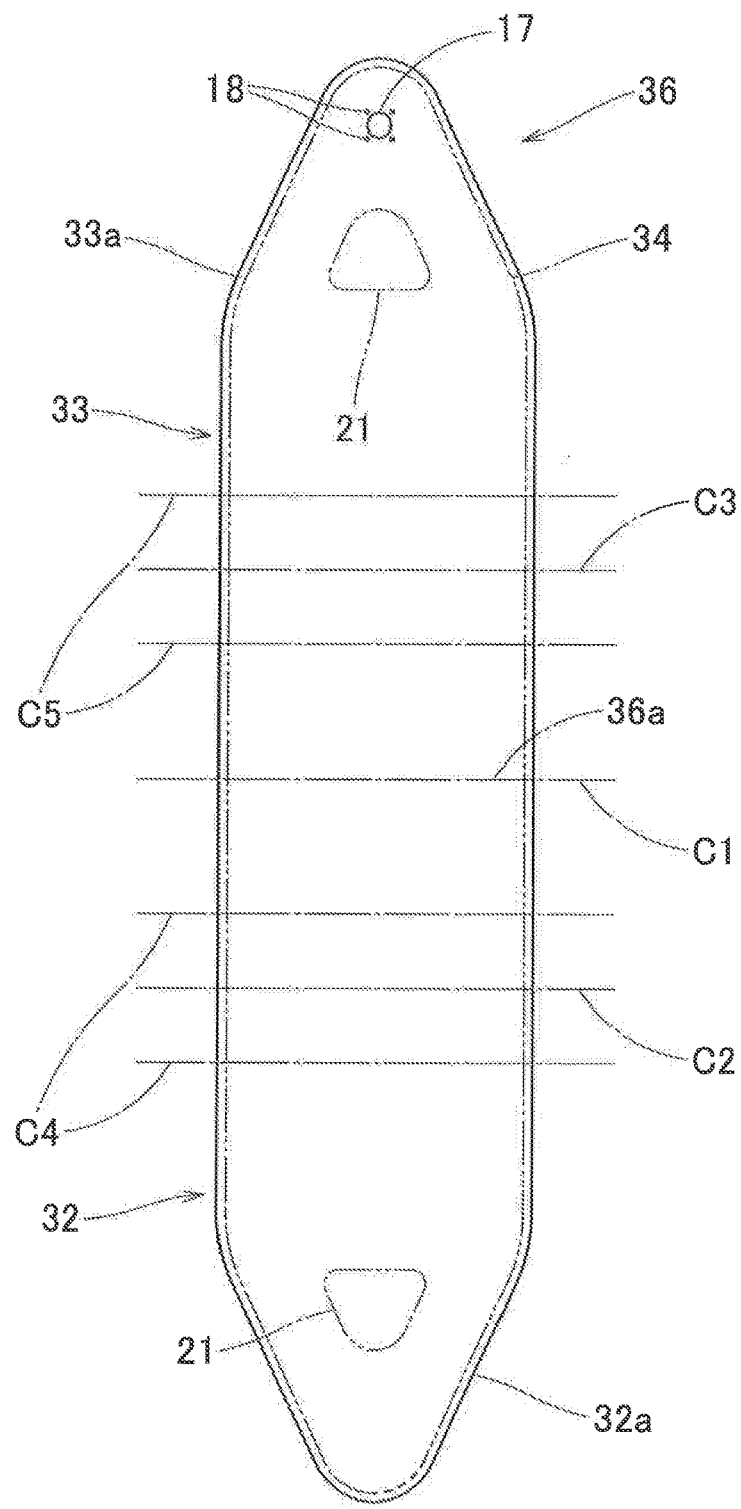
FIG. 8 is a plan view of a base material forming the airbag of the first embodiment.

The airbag 15 of the first embodiment is formed into a bag by sewing (jointing) together an outer periphery 33a of a lower panel 33, which is deployable at the underside, and an outer periphery 32a of an upper panel 32, which is deployable at the upper side, by sewing threads. The lower panel 33 and upper panel 32 are identical in outer contour. More specifically, the lower panel 33 and upper panel 32 are composed of such a one-piece base material 36 shown in FIG. 8 that the lower panel 33 and upper panel 32 are continuous at the leading ends apart from the mounting region 16. The airbag 15 is formed into a bag by sewing (jointing) together the outer peripheries 32a and 33a of the lower panel 33 and the upper panel 32 as overlaid one above the other by sewing threads. As shown in FIG. 5, an outer contour of the airbag 15 provided with a later-described folded region 25, in such a flattened and spread out state that the upper panel 32 and lower panel 33 overlap each other, is such a generally triangle that enlarges towards the protection inflatable region 23 (towards the rear end 15b) from the narrow leading end of the mounting region 16 (i.e., from the front end 15a). A sewn region (joint) 34 that sews (joints) the outer peripheries 32a and 33a of the lower panel 33 and the upper panel 32 together is formed along an entire periphery of the airbag 15 except a vicinity of a joint region 36a (i.e., the rear end 15b of the airbag 15) at which the lower panel 33 and the upper panel 32 are continuous, as shown in FIG. 5. In the illustrated embodiment, the base material 36 is composed of a flexible woven fabric of polyester yarn, polyamide yarn or the like.

Figure 6:
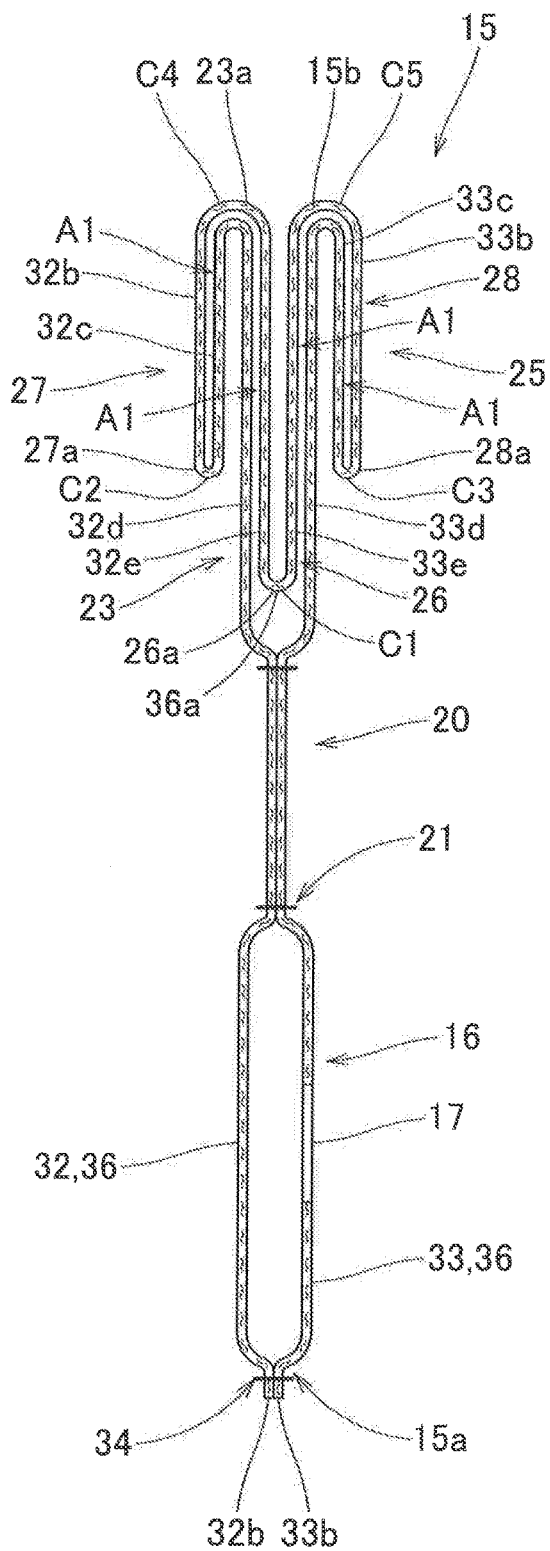
FIG. 6 is an enlarged sectional view taken along line VI-VI of FIG. 5.
Figure 7:
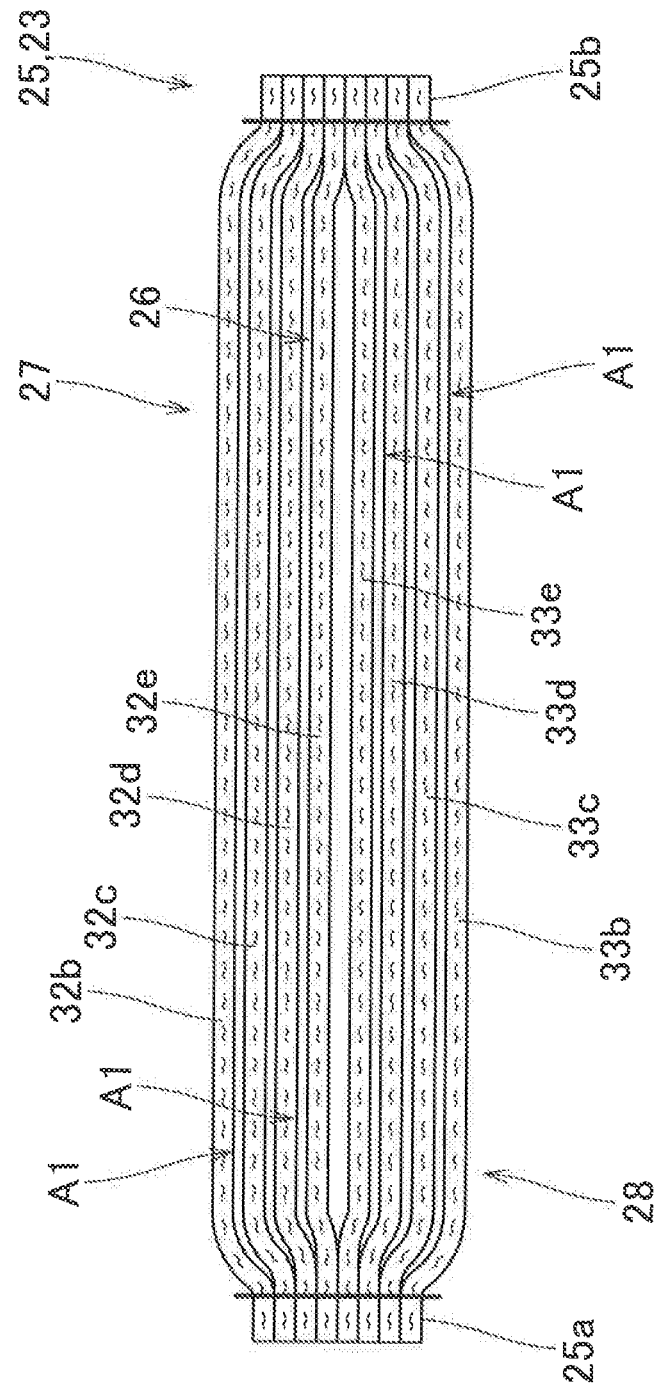
FIG. 7 is an enlarged sectional view taken along line VII-VII of FIG. 5.

Referring to FIGS. 5 to 7, the protection inflatable region 23 includes at the leading end 23a, which is apart from the mounting region 16, a folded region 25 that is formed by bringing a leading end region of the base material 36 in a two-fold state, in which the upper panel 32 and lower panel 33 are flattened and spread out in an overlapping state, closer to the mounting region 16 in such a manner as to shorten the length of the airbag 15. That is, the folded region 25 is formed by bringing the joint region 36a, at which the upper panel 32 and lower panel 33 are continuous, closer to the mounting region 16.

In a state where the upper panel 32 and lower panel 33 are spread out and overlap with each other, in other words, in a sectional shape of the airbag 15 taken along an overlapping direction of the upper panel 32 and lower panel 33 (i.e., taken along an up and down direction) as shown in FIG. 6, the folded region 25 includes an infold region 26 located at the center and an upper outfold region 27 and a lower outfold region 28 superimposed on and under the infold region 26. The infold region 26 is formed by invaginating a leading end region of the upper panel 32 and lower panel 33 before being folded (i.e., the joint region 36a) in between the upper panel 32 and lower panel 33. The upper outfold region 27 is formed by folding back a two-ply region of the upper panel 32 disposed above the infold region 26 (i.e., an upper outfold constituent portion 38 as described later) in such a manner as to reverse the leading end 38a towards the mounting region 16 on an outside (an upper side) of the upper panel 32. Likewise, the lower outfold region 28 is formed by folding back a two-ply region of the lower panel 33 disposed under the infold region 26 (i.e., a lower outfold constituent portion 39 as described later) in such a manner as to reverse the leading end 39a toward the mounting region 16 on an outside (an underside) of the lower panel 33. In the illustrated embodiment, the upper outfold region 27 and lower outfold region 28 are symmetrical in an up and down direction. In the illustrated embodiment, moreover, the leading end 26a of the infold region 26 (or the joint region 36a) is disposed to the mounting region 16 (i.e., disposed forward) relative to the leading ends 27a and 28a of the upper outfold region 27 and lower outfold region 28 as shown in FIGS. 5 and 6.

That is, in a sectional shape of the airbag 15 taken along an overlapping direction of the upper panel 32 and lower panel 33 (i.e., taken along an up and down direction), the folded region 25 has four layers (namely, a first layer 32b, a second layer 32c, a third layer 32d and a fourth layer 32e) of the upper panel 32 on the joint region 36a (i.e., on the border between the upper panel 32 and lower panel 33) while having four layers (namely, a first layer 33b, a second layer 33c, a third layer 33d and a fourth layer 33e) of the lower panel 33 beneath the joint region 36a, as shown in FIG. 6. Further, the folded region 25 is so configured that an inflatable space A1, which is inflatable with inflation gas, is provided at four regions between the opposing layers of the upper panel 32 and lower panel 33, i.e., between the first layer 32b and second layer 32c and between the third layer 32d and fourth layer 32e of the upper panel 32, and between the first layer 33b and second layer 33c, between the third layer 33d and fourth layer 33e of the lower panel 33, as shown in FIG. 6. Moreover, each of the creases C1, C2, C3, C4 and C5 forming the folded region 25 continues to the sewn region (joint) 34 that joints or sews the outer peripheries 32a and 33a of the upper panel 32 and the lower panel 33. That is, in the airbag 15, the sewn region 34, which sews (joints) the outer peripheries 32a and 33a of the upper panel 32 and lower panel 33 together, is formed in the folded region 25 as well as in the mounting region 16 and intermediate region 20. In other words, as shown in FIG. 7, the opposite edges 25a and 25b in a left and right direction of the folded region 25 are jointed together by the sewn region 34 in a state where the upper panel 32 and lower panel 33 are folded up (i.e., after the upper panel 32 and lower panel 33 are folded up).

Figure 9A:
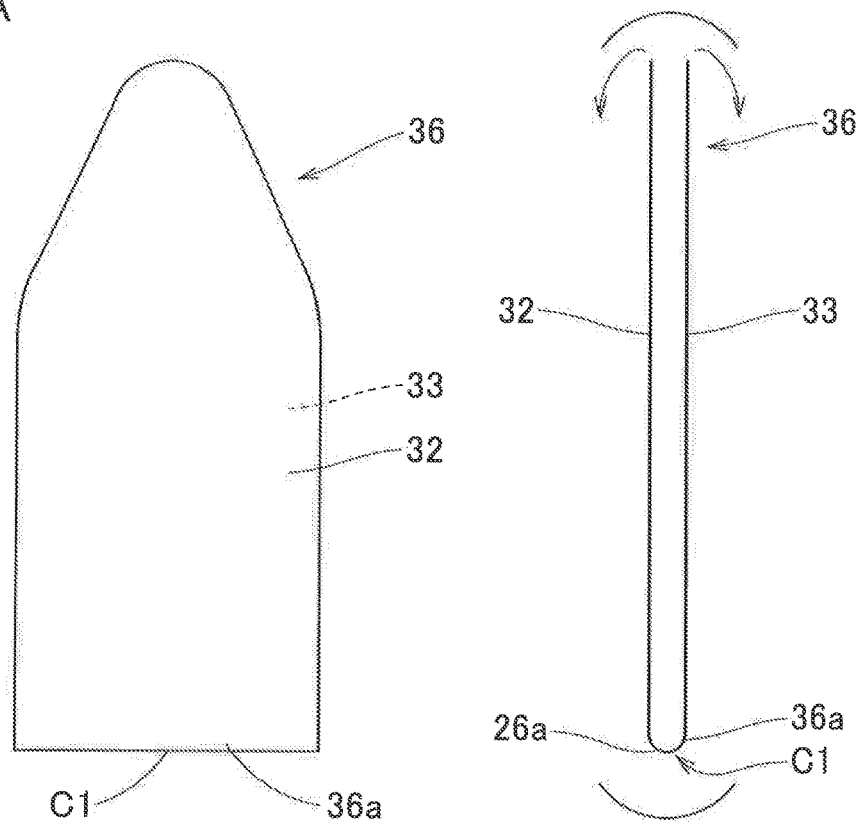
FIGS. 9A, 9B, 10A and 10B schematically illustrate the manufacturing process of the airbag of the first embodiment.
Figure 9B:
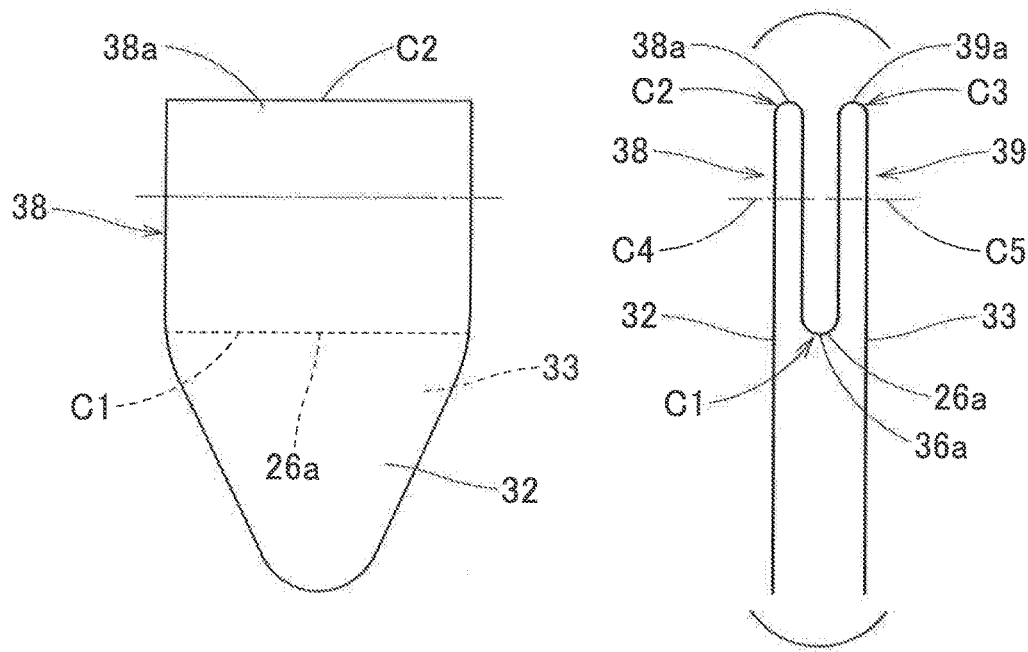
Figure 10A:
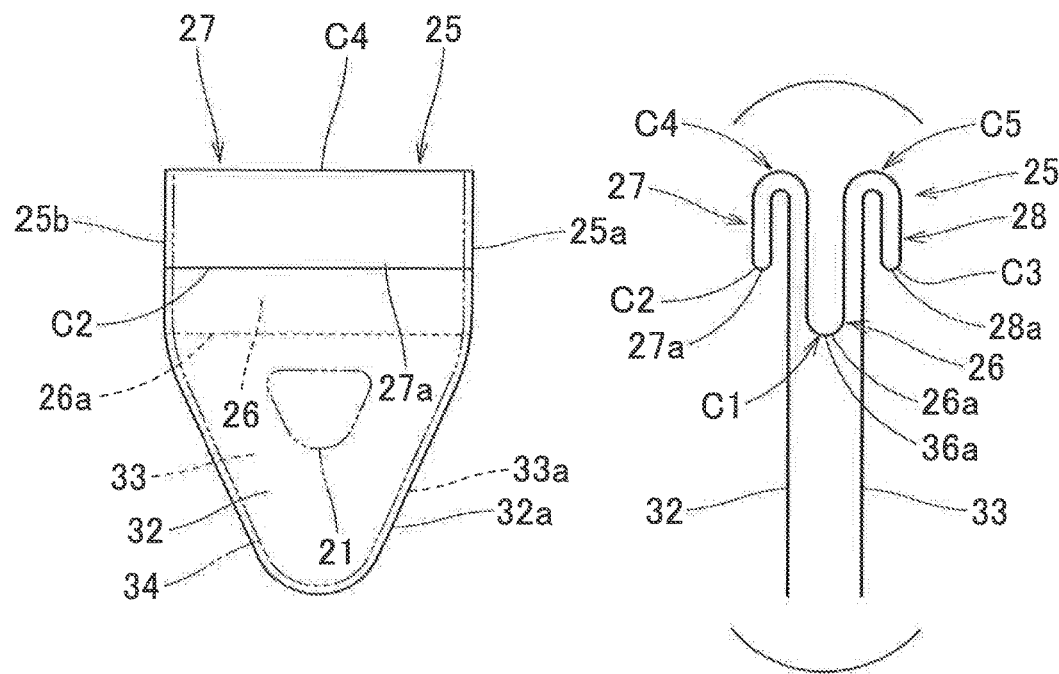
Figure 10B:
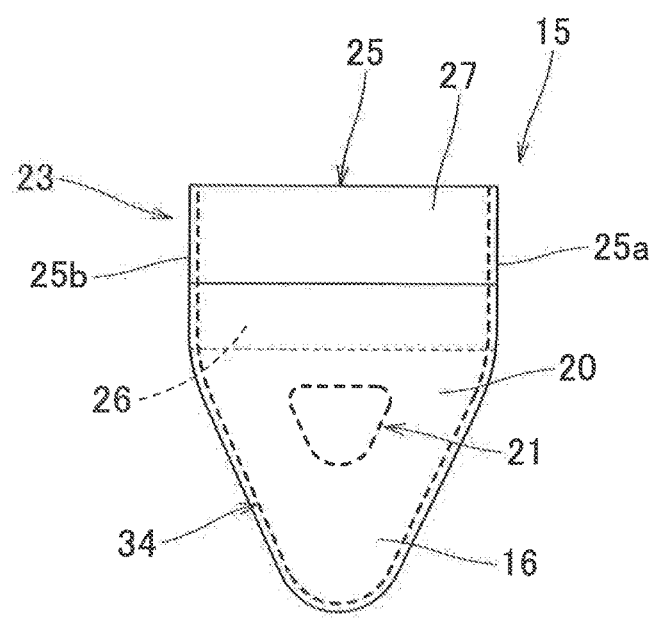

Manufacturing of the airbag 15 of the first embodiment is now described. In advance, the gas inlet port 17 and the mounting holes 18 are formed on the base material 36. Then firstly, as shown in FIG. 9A, the base material 36 is doubled such that the outer surface at airbag deployment faces in, thus providing a crease C1. A region in the vicinity of the crease C1 (i.e., a vicinity of the joint region 36a) is to form the leading end 26a of the infold region 26. Subsequently, as shown in FIG. 9B, in the doubled base material 36, each of the regions of the upper panel 32 and lower panel 33 towards the mounting region 16 is folded back on the crease C2/C3 so the outer surface at airbag deployment faces outwardly, thus providing an upper outfold constituent portion 38 and a lower outfold constituent portion 39, which are generally symmetrical in an up and down direction. At this time, the upper panel 32 and lower panel 33 are so arranged that their outer circumferential edges in the mounting region 16 align with each other. Regions in the vicinities of the creases C2 and C3 are to form the leading ends 38a and 39a of the upper outfold constituent portion 38 and lower outfold constituent portion 39 as well as the leading ends 27a and 28a of the upper outfold region 27 and lower outfold region 28. Thereafter, each of the upper outfold constituent portion 38 and lower outfold constituent portion 39, each of which having a two-ply structure, is folded back as it is on the crease C4/C5 such that regions around the creases C2 and C3 (i.e., around the leading ends 38a and 39a) are brought toward the mounting region 16, thereby forming the upper outfold region 27 and lower outfold region 28, which are generally symmetrical in an up and down direction, as well as the infold region 26. Thus the folded region 25 is formed at the leading end 23a of the protection inflatable region 23, as shown in FIG. 10A. Then the outer peripheries 32a and 33a of the upper panel 32 and lower panel 33 in a folded-up state are sewn together with sewing threads all over including the opposite edges 25a and 25b in a left and right direction of the folded region 25, thus forming the sewn region (or joint) 34. Then if the seam region 21 is formed by bringing the upper panel 32 and lower panel 33 in the intermediate region 20 into contact with each other and sewing the panels 32 and 33 together with sewing threads, the airbag 15 is completed as shown in FIG. 10B.

When the airbag 15 is completed, the retainer 9 is housed inside the airbag 15 such that the bolts 9a project out of the mounting holes 18, and then the airbag 15 is folded up. The airbag 15 is then wrapped up by a tearable wrapping sheet (not shown) for keeping the folded-up configuration. Then the airbag 15 is placed on the bottom wall 12a of the case 12 such that the bolts 9a penetrate the bottom wall 12a. Subsequently, the main body 8a of the inflator 8 is set in the case 12 from the lower side of the bottom wall 12a, while the bolts 9a projecting downwardly from the bottom wall 12a are put through the flange 8c of the inflator 8. If then the bolts 9a projecting out of the flange 8c of the inflator 8 are fastened with nuts 10, the airbag 15 and the inflator 8 are mounted on the case 12.

Thereafter, the circumferential wall 12b of the case 12 is attached to the joint wall 6c of the airbag cover 6 on the dashboard 1, which has been mounted on a vehicle, and not-shown brackets of the case 12 are secured to the vehicle body structure. Thus the airbag device S1 for a front passenger seat is mounted on the vehicle.

After mounting the airbag device S1 on the vehicle, in the event of a frontal collision of the vehicle, the inflator 8 discharges an inflation gas G from the gas discharge ports 8b to inflate the airbag 15. Then the airbag 15 pushes and opens the doors 6a and 6b of the airbag cover 6 as shown in FIG. 12. Then the airbag 15 protrudes upward from an opening formed by the opening of the doors 6a and 6b, and is deployed rearward and upward as shown in FIG. 12.

Figure 11:
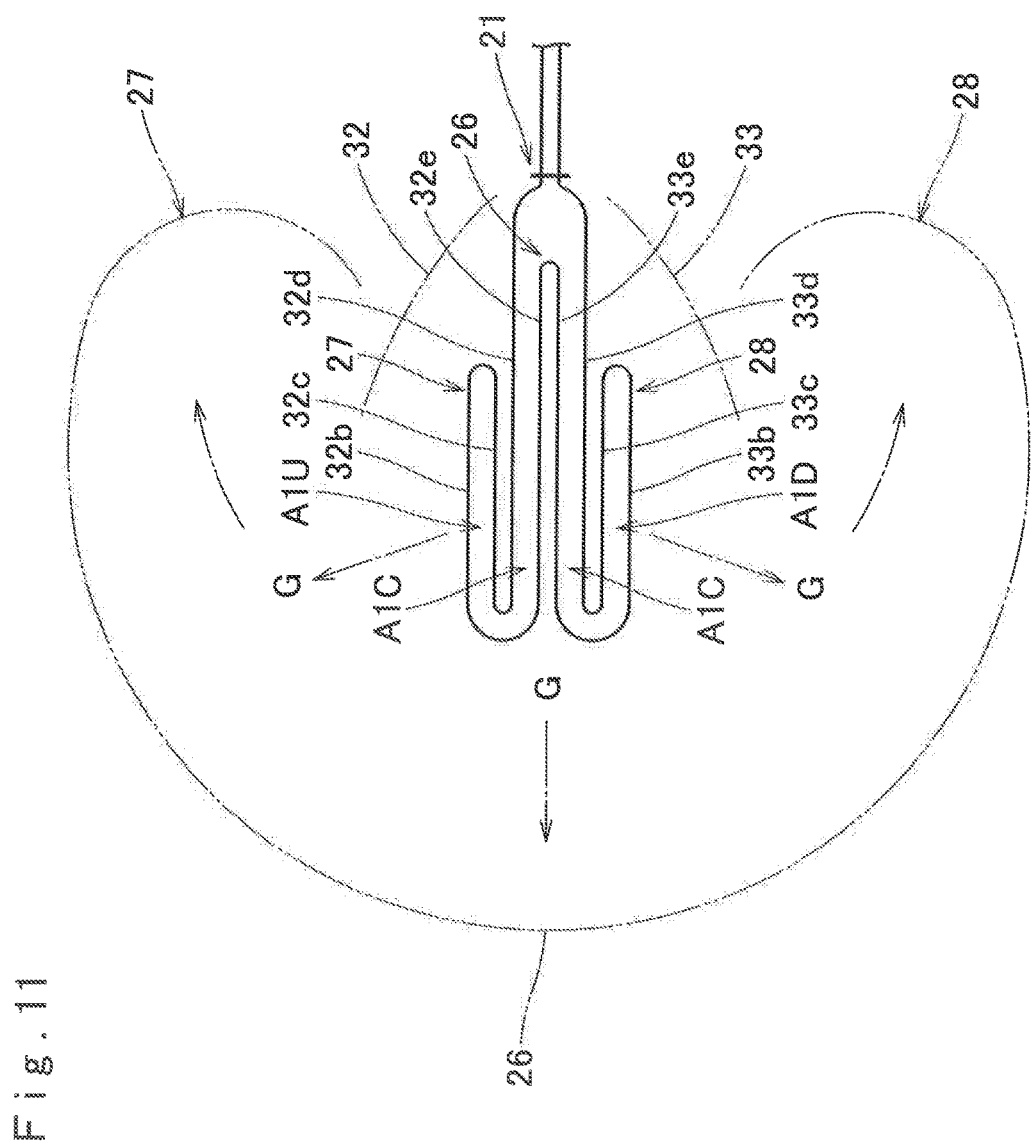
FIG. 11 schematically illustrates the way a protection inflatable region of the airbag of the first embodiment inflates.

When the airbag 15 of the first embodiment for use in the airbag device S1 for a front passenger seat is fed with an inflation gas G, the protection inflatable region 23 will inflate while unfolding the creases in the folded region 25 in such a manner as to inflate the four inflatable spaces A1 (A1U, A1D and A1C as shown in detail in FIG. 11). Since the folded region 25 includes the creases C1, C2, C3, C4 and C5 which continue to the sewn region (joint) 34 formed at the edges 25a and 25b in a left and right direction, when fed with an inflation gas G, the protection inflatable region 23 will inflate in a thick fashion in such a manner as to unfold and open up the folded region 25 with the opposite edges 25a and 25b in a left and right direction being regulated by the sewn region 34. Moreover, in the airbag 15, since the protection inflatable region 23 has a greater substantial film length in a direction perpendicular to the creases C1, C2, C3, C4 and C5 of the folded region 25 (i.e., in a direction along which the mounting region 16 and protection inflatable region 23 are disposed, i.e., in a front and rear direction) than the mounting region 16 and intermediate region 20 by the amount of the folded region 25, the protection inflatable region 23 will inflate thicker than the mounting region 16 and intermediate region 20. Further, the airbag 15 can be manufactured simply by jointing the outer peripheries 32a and 33a of the upper panel 32 and lower panel 33 having generally identical outer contours. In other words, the airbag 15 can be manufactured simply with a planar jointing work. Therefore, in a simple fashion without a complicated three-dimensional jointing work, the airbag 15 can be manufactured such that the protection inflatable region 23 inflates thicker than the mounting region 16 and intermediate region 20.

Therefore, the airbag 15 of the first embodiment has a simple configuration and easy to control the contour at deployment.

In the airbag 15 of the first embodiment, the protection inflatable region 23 for protecting an occupant (i.e., an object of protection) is inflatable thick whereas other intermediate region 20 and mounting region 16 are inflatable thinner relatively. With this configuration, although the intermediate region 20 has such a thickness that would not reach the windshield 4 and would form a void space between the intermediate region 20 and the windshield 4 at airbag deployment, the protection inflatable region 23 will inflate thick enough to protect the occupant adequately. This configuration will contribute to reduce the volume of the airbag while maintaining an adequate occupant protection property of the airbag, and further help reduce the output of the inflator 8 for feeding an inflation gas to the airbag 15.

The airbag 15 of the first embodiment includes in the intermediate region 20 a seam region 21 that partially connects the upper panel 32 and lower panel 33 in such a manner as to bring the panels 32 and 33 into contact with each other. The folded region 25 includes the infold region 26, the upper outfold region 27, the lower outfold region 28 and the four inflatable spaces A1 in between them. The seam region 21 will help keep the intermediate region 20 thin at airbag deployment and let the protection inflatable region 23 inflate thick, thus further increasing the difference in thickness between the protection inflatable region 23, and the mounting region 16 and intermediate region 20 at airbag deployment. If such advantageous effects do not have to be considered, the airbag may be provided with no seam region in the intermediate region and with only two inflatable spaces in the folded region as in the airbag depicted schematically in FIG. 35A. If the airbag has a seam region in the intermediate region and at least two inflatable spaces in the folded region, or if the airbag has three or more inflatable spaces in the folded region even though having no seam region in the intermediate region, the difference in thickness between the intermediate region and protection inflatable region will be increased.

Moreover, the airbag 15 of the first embodiment includes in the folded region 25 two outfold regions (i.e., the upper outfold region 27 and lower outfold region 28) and one infold region 26. At airbag deployment, the upper outfold region 27 and lower outfold region 28 will not protrude rearward (i.e., toward an occupant) in such a manner as to pull away from the mounting region 16, but will unfurl upward (i.e., toward an outside of the upper panel 32) and downward (i.e., toward an outside of the lower panel 33) considerably with the inflatable spaces A1 (A1U and A1D) inflated with an inflation gas G as shown in FIG. 11. The infold region 26, when taking an inflation gas G into the two inflatable spaces A1 (A1C), will inflate in such a manner as to draw away from the mounting region 16 and protrude rearward while pulling the upper panel 32 and lower panel 33 apart from each other. That is, at airbag deployment of the first embodiment, the infold region 26 (the fourth layers 32e and 33e) will inflate in a thick fashion in such a manner as to pull the upper panel 32 and lower panel 33 apart from each other while protruding rearward, and the upper outfold region 27 (the first layer 32b, second layer 32c and third layer 32d) and lower outfold region 28 (the first layer 33b, second layer 33c and third layer 33d) will inflate in such a manner as to lap with the thick inflated infold region 26, such that the protection inflatable region 23 will deploy rearward (i.e., toward an occupant) while unfurling upward and downward, i.e., in a generally round sectional shape as shown in FIG. 12.

The second embodiment of the invention is now described. An airbag 42 according to the second embodiment of the invention is adapted to be used in an airbag device S2 for a front passenger seat. Members of the airbag device S2 except the airbag 42 have the same configuration as those of the airbag device S1 of the first embodiment as shown in FIG. 17, and therefore, will be given common reference numerals, and detailed descriptions of those members will be omitted.

Figure 13:
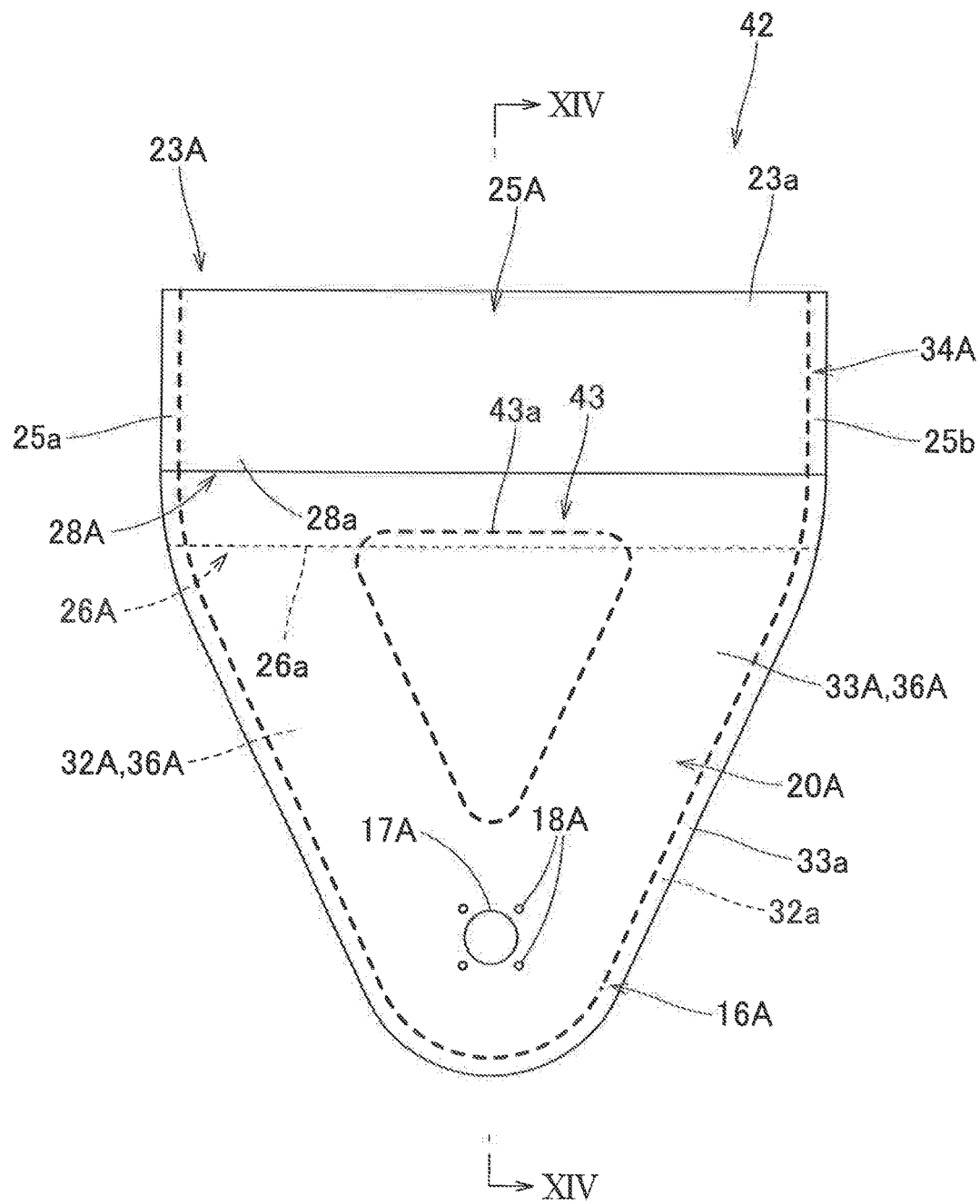
FIG. 13 is a bottom view of an airbag of the second embodiment as flattened and spread out such that an upper panel and a lower panel overlap each other.
Figure 14:
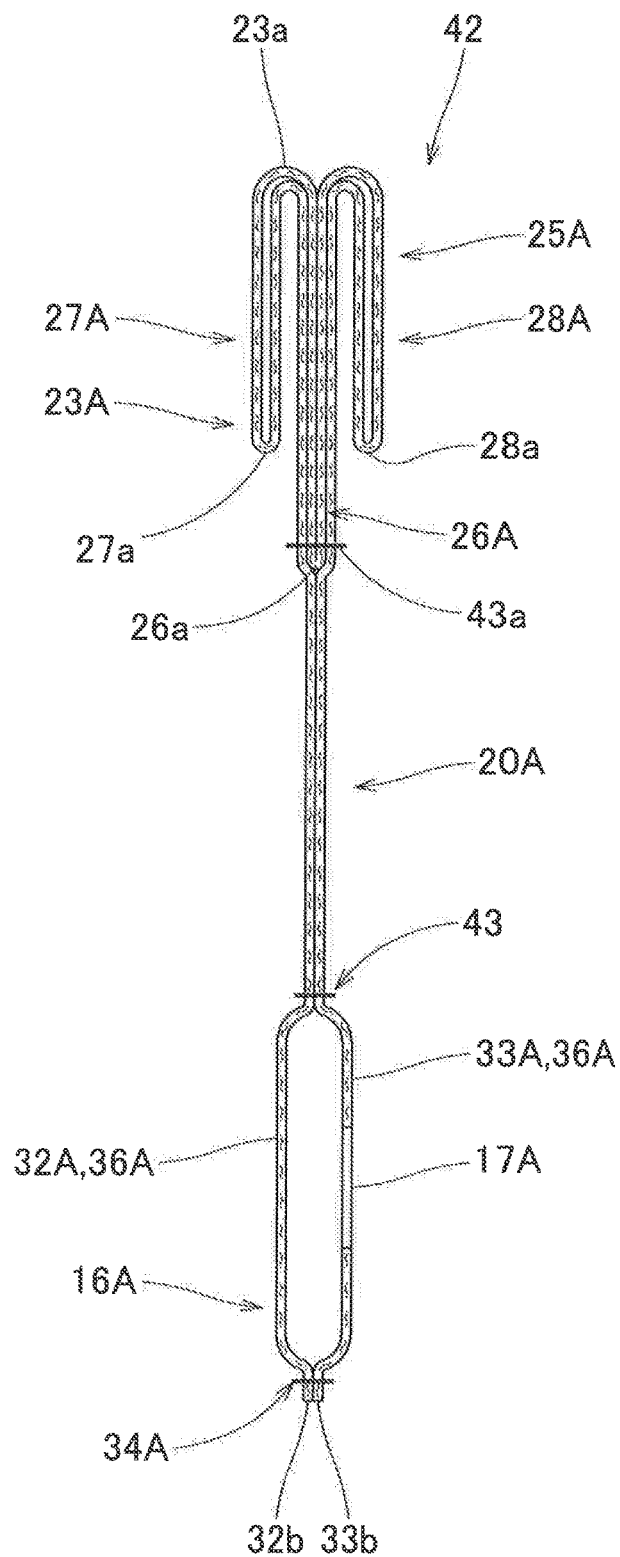
FIG. 14 is an enlarged sectional view taken along line XIV-XIV of FIG. 13.

As shown in FIGS. 13 to 16, the airbag 42 has the same configuration as the airbag 15 of the first embodiment except a seam region 43 formed in the intermediate region 20A, and therefore, common regions will be given a reference sign "A" at the end of the common reference numerals, and detailed descriptions of those regions will be omitted. The seam region 43 of the airbag 42 includes an extended region 43a that connects a part of the infold region 26A to the upper panel 32A and lower panel 33A which are opposed to each other. That is, the seam region 43 has a greater width in a front and rear direction than the seam region 21 of the airbag 15 of the first embodiment, and its rear end region (i.e., its region towards the protection inflatable region 23A), in other words, a region of the seam region 43 in the base of the triangular seam region 43, serves as the extended region 43a. The extended region 43a laps with the leading end region 26a of the infold region 26A and couples the leading end region 26a to the upper panel 32A and lower panel 33A (FIGS. 13 and 14). More specifically, the extended region 43a connects the leading end region 26a of the infold region 26A to the intermediate region 20A at a location forward (i.e., towards the mounting region 16A) relative to the leading ends 27a and 28a of the upper outfold region 27A and lower outfold region 28A (FIG. 14). The airbag 42 of the second embodiment can be manufactured in a similar fashion to the airbag 15 of the first embodiment.

Figure 15:
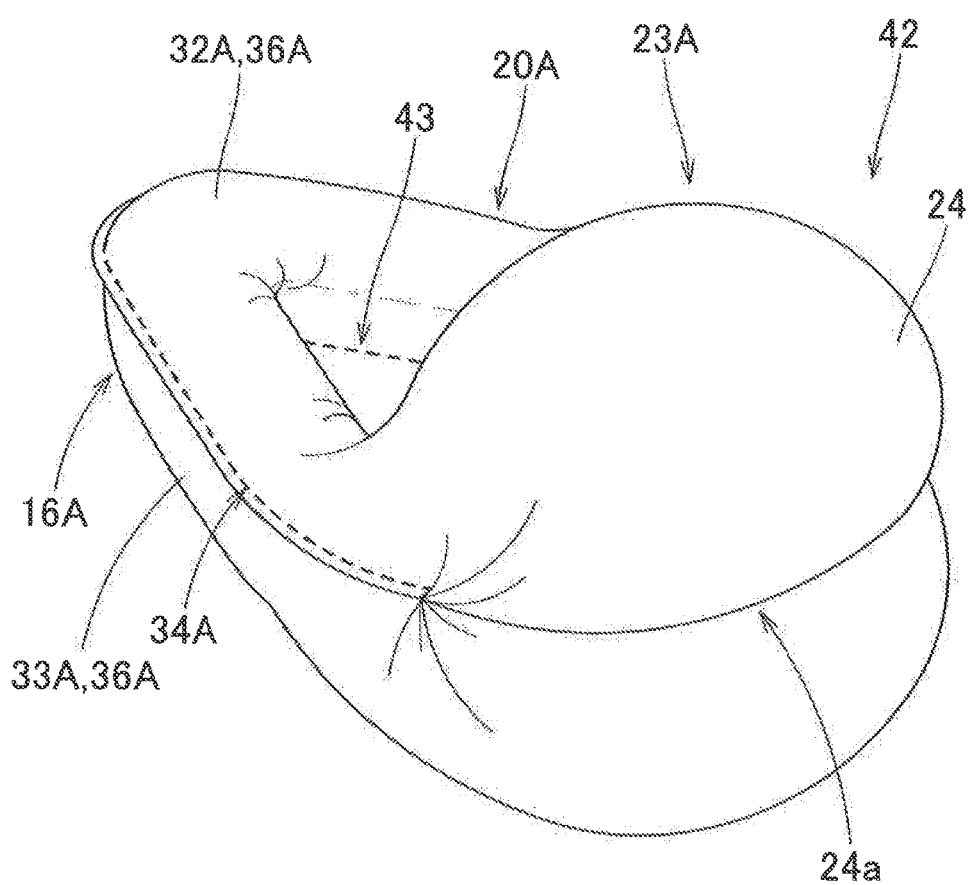
FIG. 15 is a schematic perspective view of the airbag of the second embodiment as inflated by itself and viewed from the rear.
Figure 16:
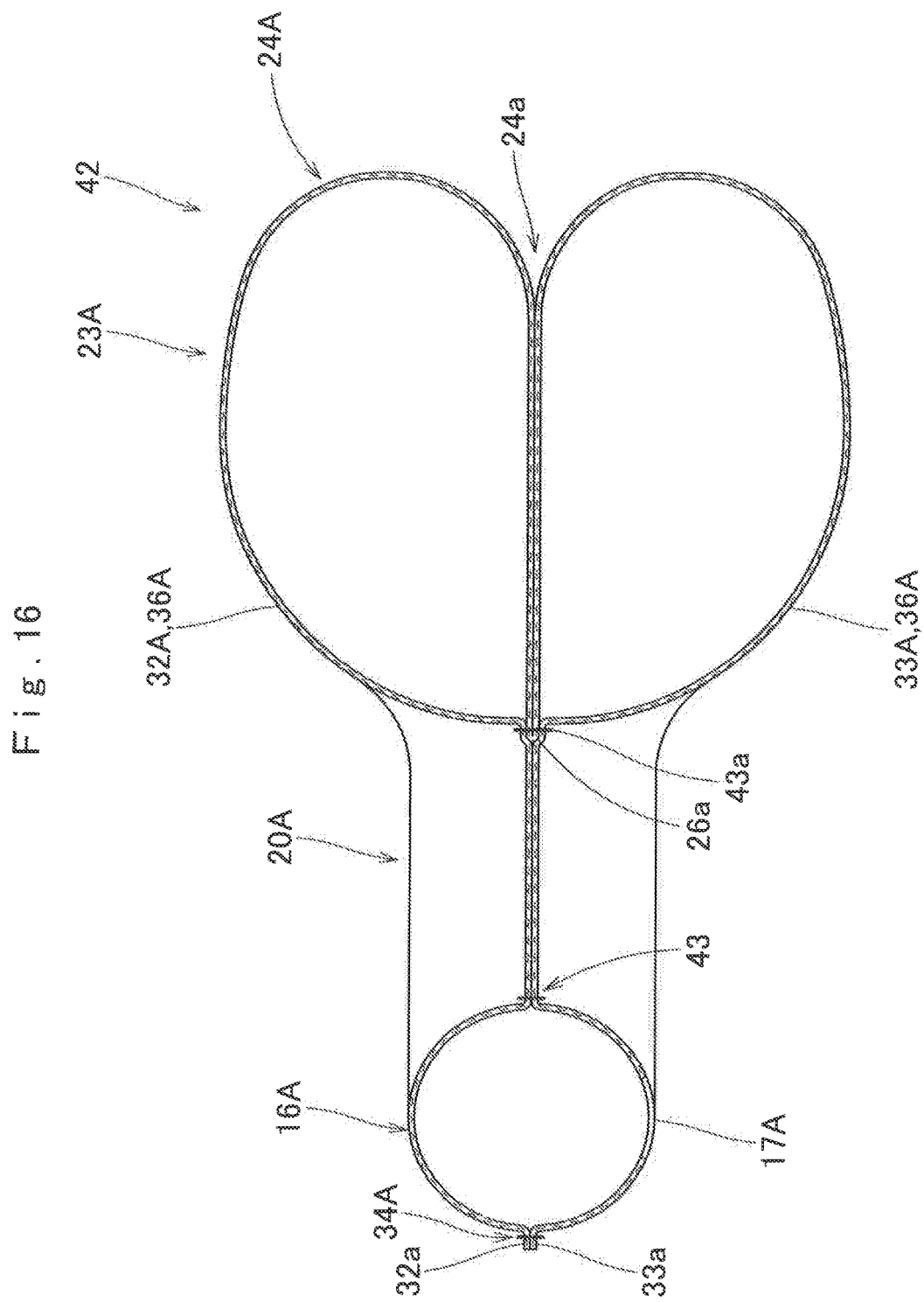
FIG. 16 is a schematic vertical section of the airbag of the second embodiment as inflated by itself.
Figure 17:
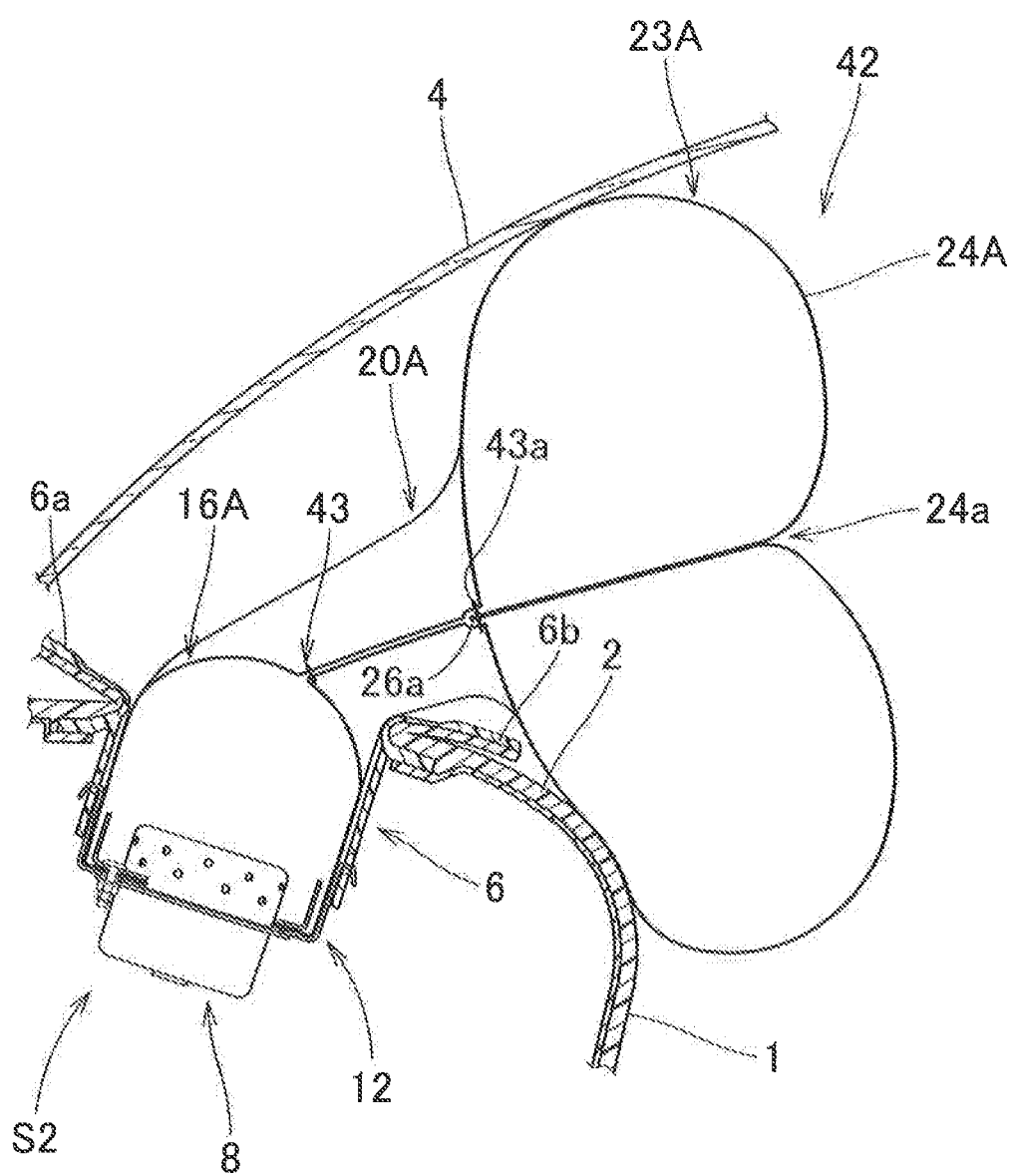
FIG. 17 is a schematic vertical section of an airbag device for a front passenger seat employing the airbag of the second embodiment as fully deployed.

At airbag deployment of the airbag device S2 for a front passenger seat, as shown in FIG. 17, the leading end 26a of the infold region 26A of the airbag 42, which faces towards the mounting region 16A, will be prevented from protruding rearward towards an occupant (i.e., an object of protection) since it is coupled to the intermediate region 20A by the extended region 43a of the seam region 43. Further, since the extended region 43a is located in a region of the seam region 43 which is extensive in a left and right direction, it couples the leading end 26a of the infold region 26A to the intermediate region 20A by the extensive region. That is, the occupant protection plane 24A of the airbag 42 of the second embodiment, which is disposed at the rear side of the protection inflatable region 23A at airbag deployment, will be provided with a recessed portion 24a which is sunken forward at a generally center in an up and down direction of the occupant protection plane 24A and extends in a left and right direction over a generally entire area in a left and right direction, as shown in FIGS. 15 and 16. Accordingly, the protection inflatable region 23A of the airbag 42 of the second embodiment will be prevented from protruding considerably towards an occupant and will inflate in such a flat fashion as to widen the occupant protection plane 24A in an up and down direction as shown in FIG. 17. As a consequence, the airbag 42 will secure a wide area for protecting the occupant in an adequate fashion. Moreover, this configuration will also help prevent the protection inflatable region 23A from inflating in an unduly thick fashion, in other words, help increase a thin area, thereby reducing the volume of the airbag relative to the airbag 15 of the first embodiment while keeping an adequate occupant protection property.

The airbag 42 of the second embodiment includes the two outfold regions (i.e., the upper outfold region 27A and lower outfold region 28A) on and under the infold region 26A, in a similar fashion to the first embodiment. At airbag deployment, the upper outfold region 27A and lower outfold region 28A will unfurl upward (i.e., toward an outside of the upper panel 32A) and downward (i.e., toward an outside of the lower panel 33A), which will help widen the occupant protection plane 24A in an up and down direction although the occupant protection plane 24A is sunken forward at the center in an up and down direction, thus covering the front side of the occupant in a wide fashion in an up and down direction.

Each of the airbags 15 and 42 of the first and second embodiment is formed into a bag by jointing (sewing) together the outer peripheries 32a and 33a of the upper panel 32/32A and the lower panel 33/33A which are opposed to each other in an up and down direction. However, the direction in which two constituent panels of the airbag are opposed should not be limited to an up and down direction. Two panels may be opposed in a left and right direction to form an airbag like an airbag 46 according to the third embodiment adapted to be used in an airbag device S3 or a front passenger seat, which will be described below. Moreover, the upper panel 32/32A and lower panel 33/33A to form the airbag 15/42 in the first and second embodiment are composed of a one-piece base material 36 in which the lower panel and upper panel are continuous at the leading ends apart from the mounting region 16/16A. However, the two panels for forming the airbag may be composed of separate cloth members as in the airbag 46.

Figure 24:
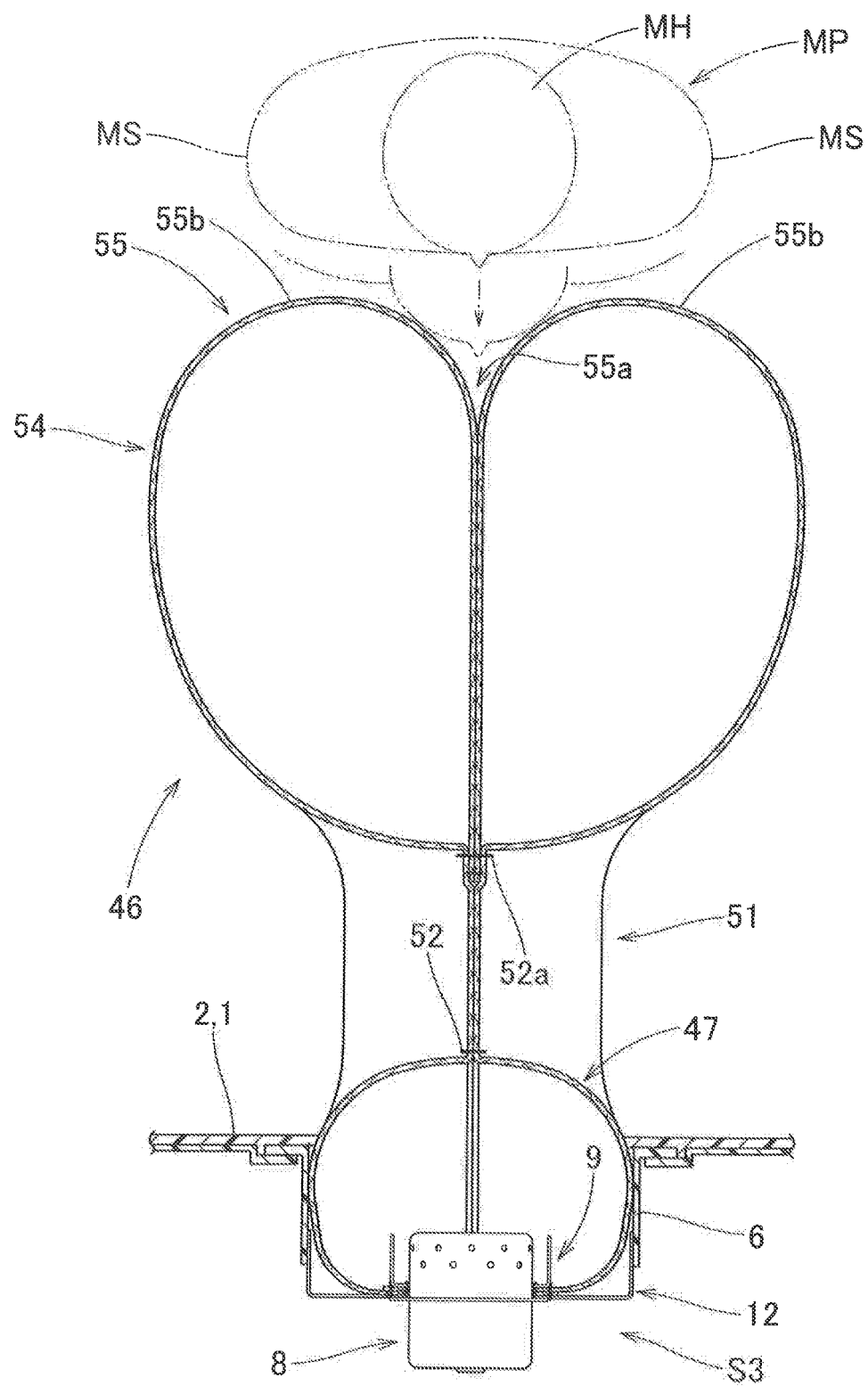
FIG. 24 is a schematic horizontal section of an airbag device for a front passenger seat employing the airbag of the third embodiment as fully deployed.

In the airbag device S3 for a front passenger seat according to the third embodiment, members of the airbag device S3 except the airbag 46 have the same configuration as those of the airbag device S1 of the first embodiment as shown in FIG. 24, and therefore, will be given common reference numerals, and detailed descriptions of those members will be omitted.

Figure 18:
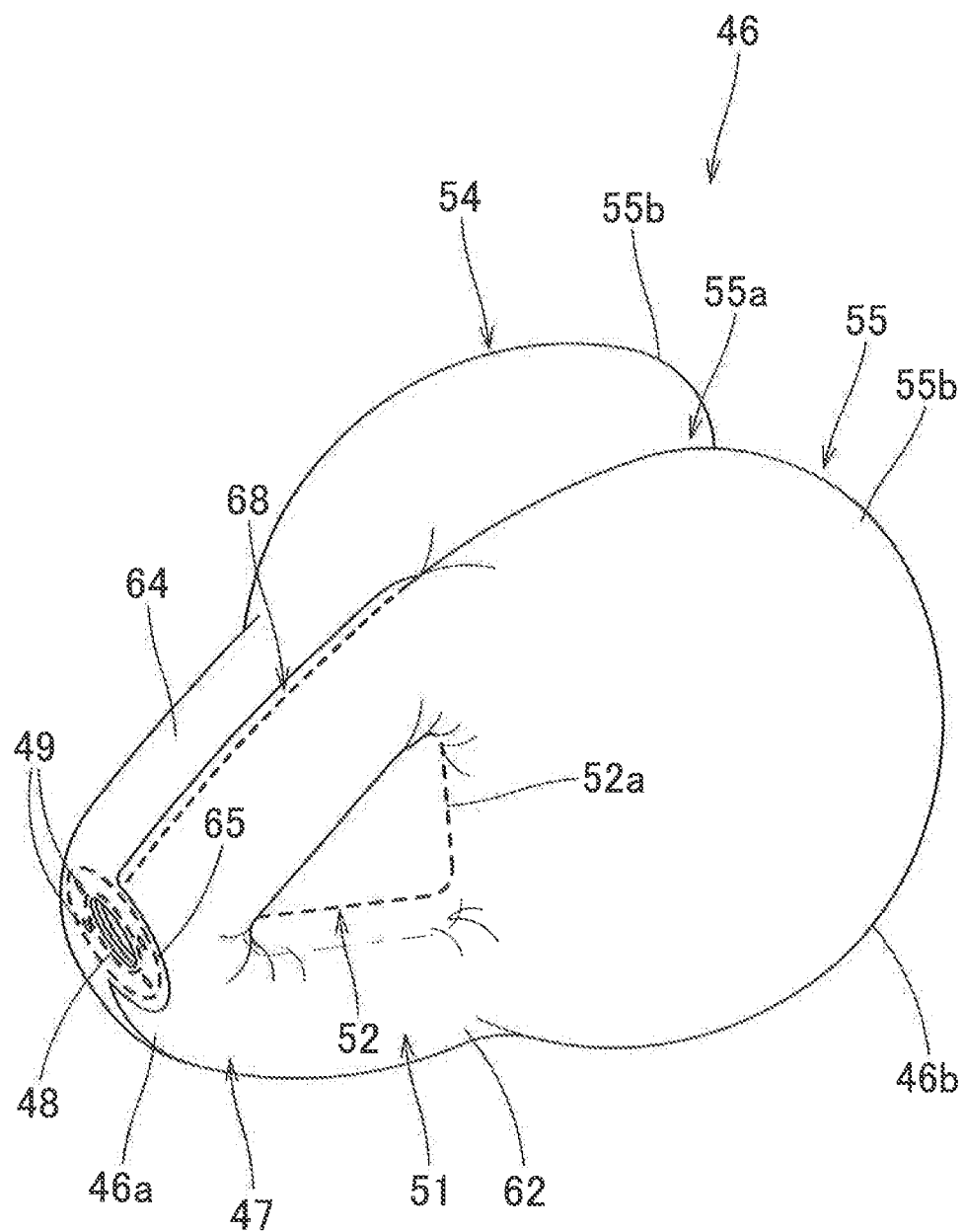
FIG. 18 is a schematic perspective view of an airbag of the third embodiment as inflated by itself and viewed from the front.
Figure 19:
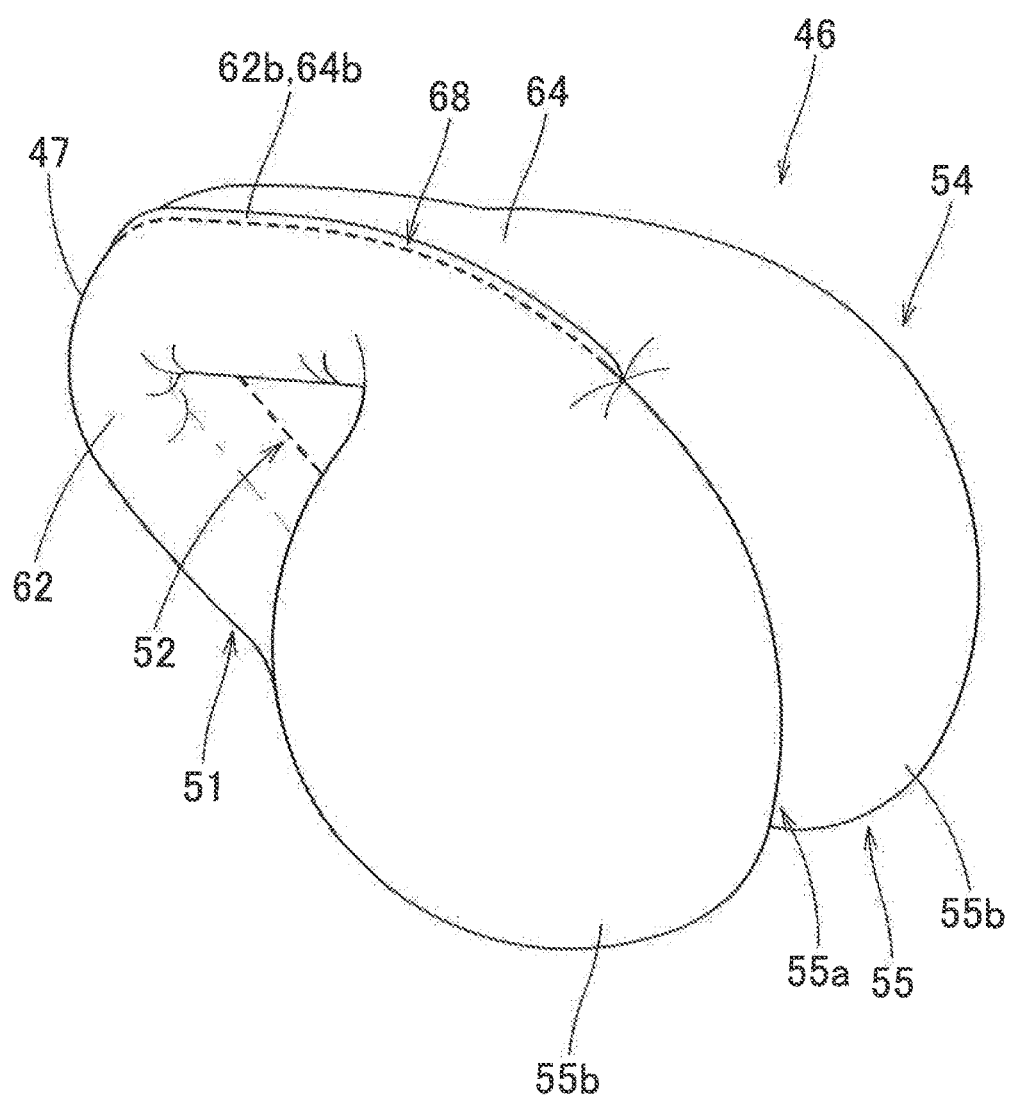
FIG. 19 is a schematic perspective view of the airbag of the third embodiment as inflated by itself and viewed from the rear.
Figure 20:
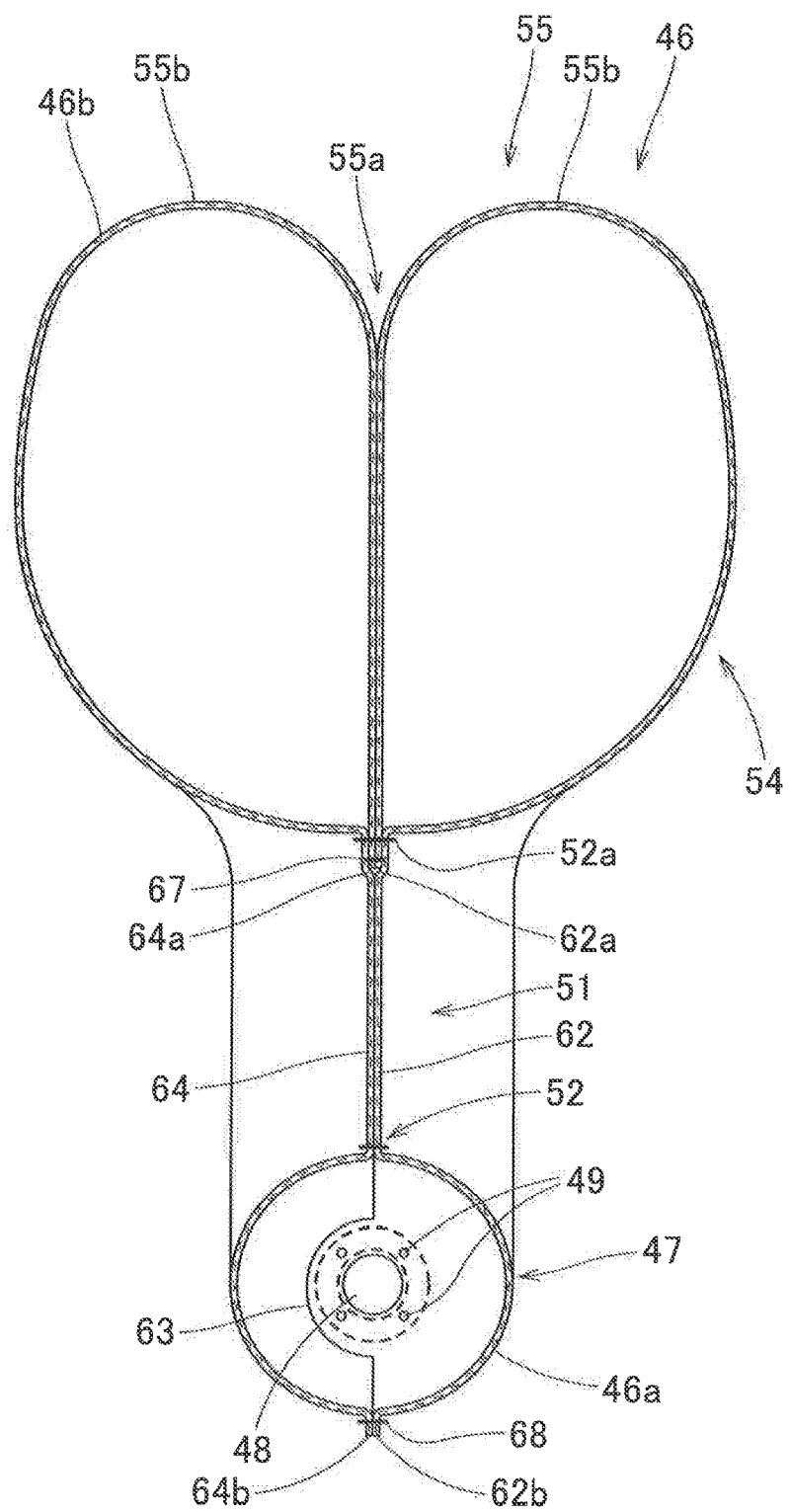
FIG. 20 is a schematic horizontal section of the airbag of the third embodiment as inflated by itself.

Referring to FIGS. 18 to 20, in a similar fashion to the afore-described airbag 15, the airbag 46 includes a mounting region 47 that is located at the front end 46a of the airbag 46 at deployment and mounted on the case 12, a protection inflatable region 54 that is located at the leading end (i.e., at the rear end 46b) and deployable apart from the case 12 and towards an occupant, and an intermediate region 51 that is disposed between the mounting region 47 and protection inflatable region 54. The mounting region 47 is provided, on the underside at deployment, with a gas inlet port 48 and mounting holes 49 (FIGS. 18 and 20).

Figure 21:
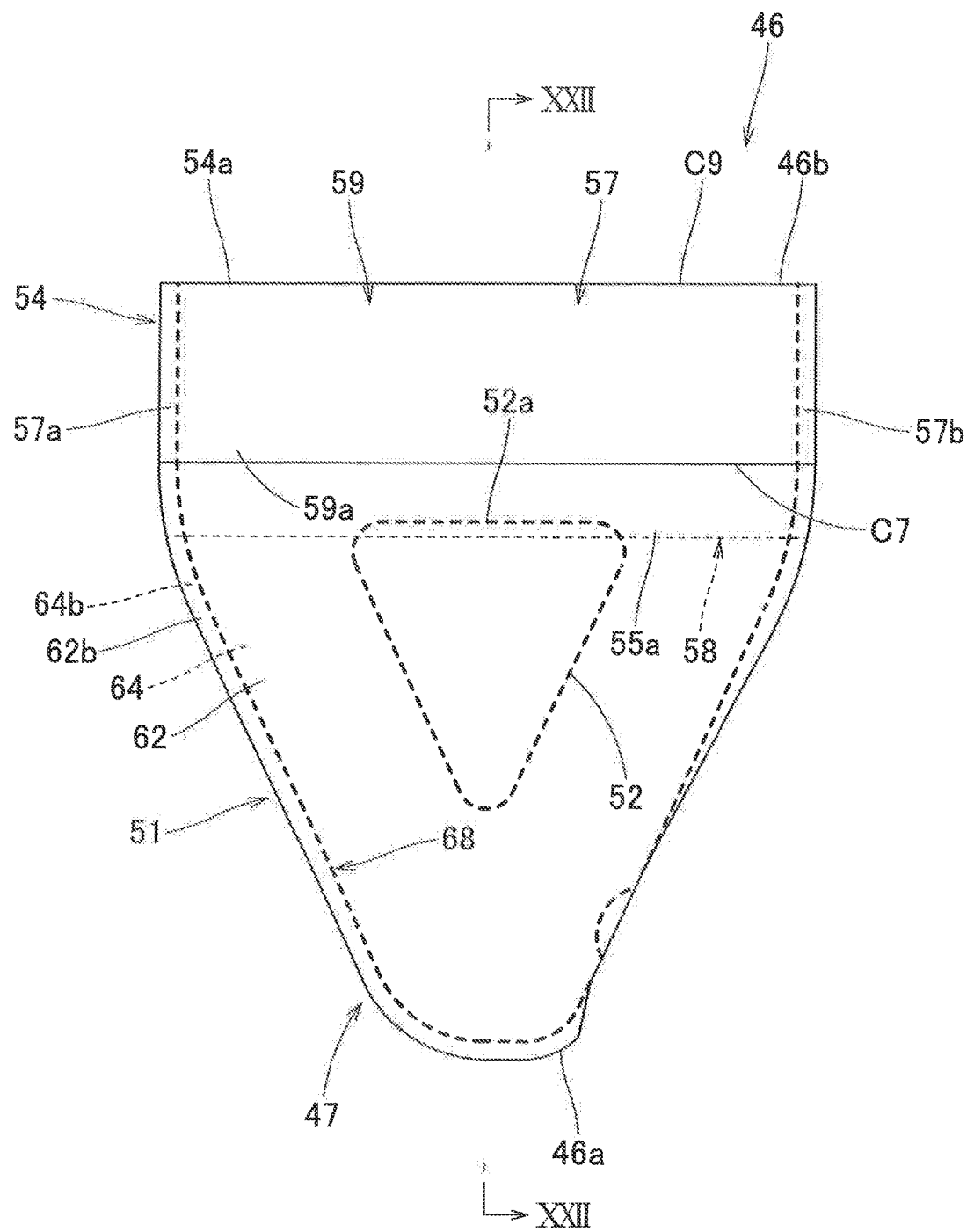
FIG. 21 is a side view of the airbag of the third embodiment as flattened and spread out such that a left panel and a right panel overlap each other.

The intermediate region 51 includes a seam region 52 that partially connects later-described left panel 62 and right panel 64 in such a manner as to bring the panels 62 and 64 into contact with each other (FIGS. 18 to 20). In the illustrated embodiment, the seam region 52 is formed by sewing the left panel 62 and right panel 64 together by sewing threads. As shown in FIG. 21, the seam region 52 is formed into such a generally triangle that enlarges toward the protection inflatable region 54, in other words, such a generally triangle that the vertex faces toward the mounting region 47 while the base faces toward the protection inflatable region 54, when the airbag 46 so flattened and spread out that the left panel 62 and right panel 64 are laid one over the other is viewed from a left and right direction. Corners of the seam region 52 are chamfered and rounded in order to avoid stress concentration upon airbag deployment. Further, as shown in FIGS. 21 and 22, in a similar fashion to the seam region 43 of the airbag 42 of the second embodiment, a rear end region (i.e., a region towards the protection inflatable region 54 or the base region of the triangle) of the seam region 52 serves as an extended region 52a that laps with a leading end region 58a of a later-described infold region 58 and couples the leading end region 58a to the left panel 62 and right panel 64 over an extended region in an up and down direction.

As shown in FIG. 20, the protection inflatable region 54 is inflatable thicker than the mounting region 47 and intermediate region 51 in horizontal sectional shape as taken along a front and rear direction. The width in an up and down direction of the protection inflatable region 54 as inflated is also greater than those of the mounting region 47 and intermediate region 51 as shown in FIGS. 18 and 19. Since the leading end region 58a of the infold region 58 is coupled to the intermediate region 51 by the seam region 52 over an extended area, a recessed portion 55a, which is sunken forward, is formed at a generally center in a left and right direction of the occupant protection plane 55, of the protection inflatable region 54, deployable at the rear side (i.e., towards an occupant) at airbag deployment (FIG. 20). Since the infold region 58 is formed over an entire area in an up and down direction of the airbag 46, the recessed portion 55a extends generally in an up and down direction over a generally entire area in an up and down direction of the occupant protection plane 55 at airbag deployment. That is, the occupant protection plane 55 of the airbag 46 of the third embodiment includes the recessed portion 55a that is sunken forward at the generally center in a left and right direction and two raised portions 55b that protrude towards an occupant (i.e., rearward) relatively on the left and right sides of the recessed portion 55a, as shown in FIG. 20.

Figure 23:
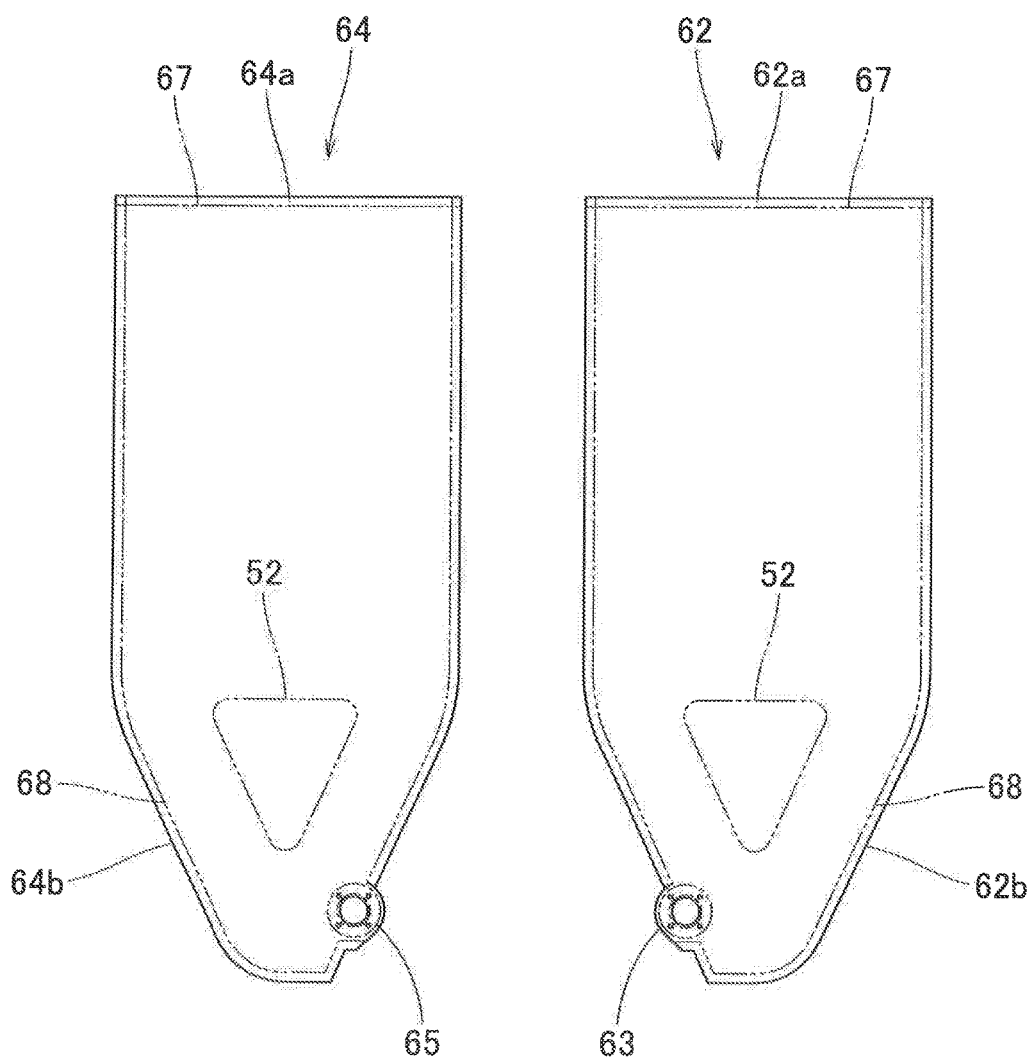
FIG. 23 is a plan view of base materials forming the airbag of the third embodiment.

The airbag 46 of the third embodiment is formed into a bag by sewing (jointing) together outer peripheries of a left panel 62, which is deployable at the left side, and a right panel 64, which is deployable at the right side, by sewing threads. The left panel 62 and right panel 64 are identical in outer contour. As shown in FIG. 23, the left panel 62 and right panel 64 of the illustrated embodiment are separate members. Each of the left panel 62 and right panel 64 is so configured in outer contour that the front end region to form the mounting region 47 has a narrow width, and the region to form the intermediate region 51 enlarges toward the rear region to form the protection inflatable region 54. Each of the left panel 62 and right panel 64 includes at the front end region to form the mounting region 47 a protruding region 63/65 to form a peripheral area of the gas inlet port 48. Each of the left panel 62 and right panel 64 is formed of a flexible woven fabric of polyester yarn, polyamide yarn or the like. The airbag 46 of the third embodiment is formed into a bag by sewing together peripheral regions (outer peripheries 62b, 64b and rear edges 62a and 64a) of the left panel 62 and right panel 64 except the protruding regions 63 and 65, and then by overlaying the protruding regions 63 and 65 one on the other and sewing them together at the peripheral area of the gas inlet port 48. It will be appreciated that the left panel 62 and right panel 64 may be composed of such a one-piece base material that the left and right panels 62 and 64 are continuous at the leading ends apart from the mounting region like the airbags 15 and 15A in the first and second embodiments.

Figure 22:
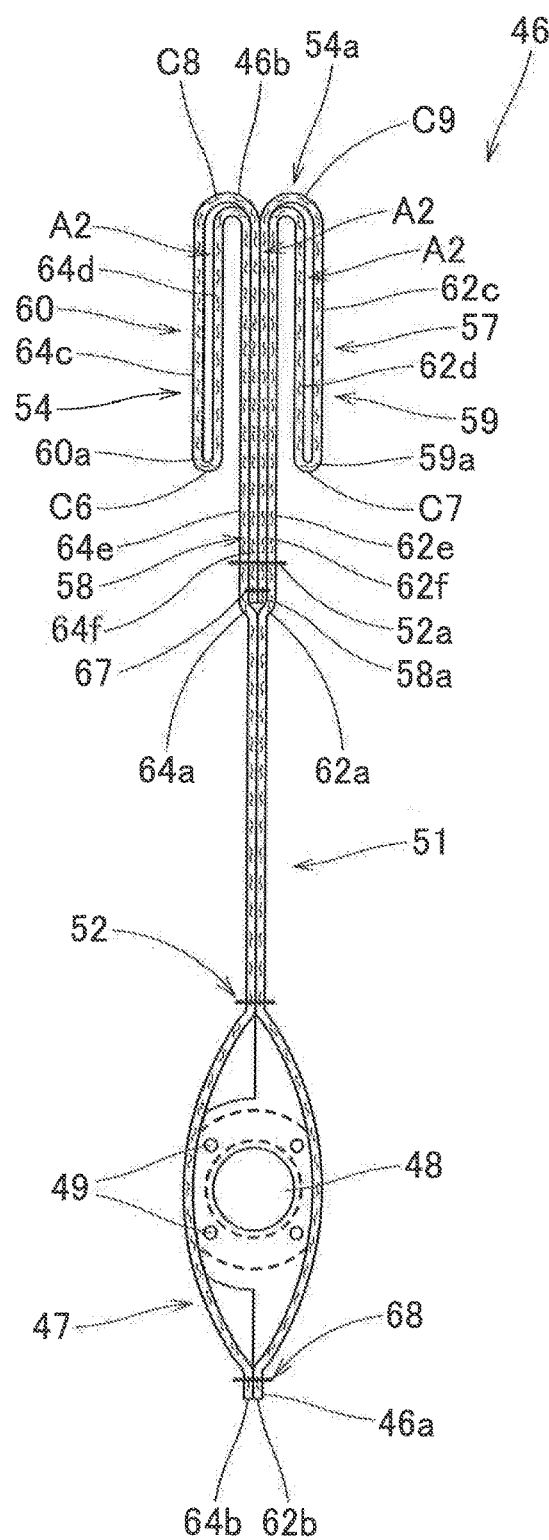
FIG. 22 is an enlarged sectional view taken along line XXII-XXII of FIG. 21.

The protection inflatable region 54 includes at the leading end 54a, which is apart from the mounting region 47, a folded region 57 that is formed by bringing a leading end region 54a of the protection inflatable region 54 as the left panel 62 and right panel 64 are flattened and spread out in an overlapping fashion (i.e., the rear end regions 62a and 64a of the left panel 62 and right panel 64) closer to the mounting region 47 in such a manner as to reduce the length of the airbag 46 (FIGS. 21 and 22). Although the rear edges 62a and 64a of the left panel 62 and right panel 64 are sewn together with sewing threads, the sewn region 67 sewing the rear edges 62a and 64a together is so formed as not to expose its seam allowances to outside of the airbag 46 as shown in FIGS. 20 and 22.

In a state where the left panel 62 and right panel 64 are spread out and overlap with each other, in other words, in a sectional shape of the airbag 46 taken along an overlapping direction of the left panel 62 and right panel 64 (i.e., taken along a left and right direction) as shown in FIG. 22, the folded region 57 includes an infold region 58 located at the center and a left outfold region 59 and a right outfold region 60 disposed on the left and right sides of the infold region 58. The infold region 58 is formed by invaginating leading end regions (i.e., the rear end regions 62a and 64a) of the left panel 62 and right panel 64 before being folded, i.e., the sewn region 67 sewing the rear end regions 62a and 64a together, in between the left panel 62 and lower panel 64. In a similar fashion to the airbag 15 in the foregoing embodiment, the left outfold region 59 is formed by folding back a two-ply region of the left panel 62 disposed on the left side of the infold region 58 in such a manner as to reverse the leading end towards the mounting region 47 at an outside (i.e., at the left side) of the left panel 62. Likewise, the right outfold region 60 is formed by folding back a two-ply region of the right panel 64 disposed on the right side of the infold region 58 in such a manner as to reverse the leading end towards the mounting region 47 at an outside (i.e., at the right side) of the right panel 64. The left outfold region 59 and right outfold region 60 are symmetrical in a left and right direction also in the airbag 46. Moreover, the leading end 58a of the infold region 58 is disposed to the mounting region 47 (i.e., disposed forward) relative to the leading ends 59a and 60a of the left outfold region 59 and right outfold region 60, and the extended region 52a of the seam region 52 connects the leading end region 58a of the infold region 58 to the intermediate region 51 at a location forward (i.e., towards the mounting region 47) relative to the leading ends 59a and 60a of the left outfold region 59 and right outfold region 60 (FIG. 22).

In a sectional shape of the airbag 46 taken along an overlapping direction of the left panel 62 and right panel 64 (i.e., taken along a left and right direction), the folded region 57 has four layers (namely, a first layer 62c, a second layer 62d, a third layer 62e and a fourth layer 62t) of the left panel 62 on the left side of the sewn region 67 sewing the rear edges 62a and 64a of the left panel 62 and right panel 64 together while having also four layers (namely, a first layer 64c, a second layer 64d, a third layer 64e and a fourth layer 64f) of the right panel 64 on the right side of the sewn region 67, as shown in FIG. 22. Further, the folded region 57 is so configured that an inflatable space A2, which is inflatable with inflation gas G, is provided at four regions between the opposing layers of the left panel 62 and right panel 64, i.e., between the first layer 62c and second layer 62d and between the third layer 62e and fourth layer 62f of the left panel 62, and between the first layer 64c and second layer 64d, between the third layer 64e and fourth layer 64f of the right panel 64. Moreover, each of later-described creases C6, C7, C8, and C9 forming the folded region 57 continues to the sewn region (joint) 68 that joints or sews the outer peripheries 62b and 64b of the left panel 62 and the right panel 64 except the rear edges 62a, 64a and protruding regions 63 and 65 as shown in FIG. 21. That is, also in the airbag 46, the sewn region 68, which sews (joints) the outer peripheries 62b and 64b of the left panel 62 and lower panel 64 together, is formed in the folded region 57 as well as in the mounting region 47 and intermediate region 51. In other words, the edges 57a and 57b in an up and down direction of the folded region 57 are jointed together by the sewn region 68 in a state where the left panel 62 and right panel 64 are folded up.

Manufacturing of the airbag 46 of the third embodiment is now described. Since the airbag 46 is manufactured by a similar process to that of the airbag 15 of the first embodiment, its graphic illustration will be omitted. The left panel 62 and right panel 64 are sewn together with sewing threads by the rear edges 62a and 64a, thus forming the sewn region 67, which forms the leading end 58a of the infold region 58. Then firstly, in a state where the left panel 62 and right panel 64 overlap with the outer surface at airbag deployment facing inward, each of the regions of the panels 62 and 64 towards the mounting region 47 is folded back on the crease C6/C7 so the outer surface at airbag deployment faces outwardly, thus providing a left outfold constituent portion and a right outfold constituent portion, which are generally symmetrical in a left and right direction. Regions in the vicinities of the creases C6 and C7 are to form the leading ends 59a and 60a of the left outfold region 59 and right outfold region 60. Thereafter, each of the left outfold constituent portion and right outfold constituent portion, each of which having a two-ply structure, is folded back as it is on the crease C8/C9 such that regions around the creases C6 and C7 are brought toward the mounting region 47, thereby providing the left outfold region 59 and right outfold region 60, which are generally symmetrical in a left and right direction, as well as the infold region 58. Thus the folded region 57 is formed at the leading end 54a of the protection inflatable region 54. Then the protruding regions 63 and 65 of the left panel 62 and right panel 64 are matched and sewn together by a peripheral area of the gas inlet port 48 while keeping the folded-up configuration of the folded region 57, and then the gas inlet port 48 and mounting holes 49 are punched out. Subsequently, the outer peripheries 62b and 64b of the left panel 62 and right panel 64 overlapping each other are sewn together with sewing threads all over including the opposite edges 57a and 57b in an up and down direction of the folded region 57, thus forming the sewn region 68. Then if the seam region 52 is formed by bringing the left panel 62 and right panel 64 in the intermediate region 51 into contact with each other and sewing the panels 62 and 64 together with sewing threads, the airbag 46 is completed.

When the airbag 46 of the third embodiment for use in the airbag device S3 for a front passenger seat is fed with an inflation gas G, the protection inflatable region 54 will inflate while unfolding the creases in the folded region 57 in such a manner as to inflate the four inflatable spaces A2. Since the folded region 57 includes the creases C6, C7, C8 and C9 which continue to the sewn region 68 formed at the opposite edges 57a and 57b in an up and down direction, the protection inflatable region 54 will inflate in a thick fashion in such a manner as to unfold and open up the folded region 57 with the edges 57a and 57b in an up and down direction regulated by the sewn region 68 at airbag deployment. Moreover, also in the airbag 46, since the protection inflatable region 54 has a greater substantial film length in a direction perpendicular to the creases C6, C7, C8 and C9 of the folded region 57 (i.e., in a direction along which the mounting region 47 and protection inflatable region 54 are disposed, i.e., in a front and rear direction) than the mounting region 47 and intermediate region 51 by the amount of the folded region 57, the protection inflatable region 54 will inflate thicker than the mounting region 47 and intermediate region 51. Further, the airbag 46 can be manufactured simply by jointing the outer peripheries 62b and 64b of the left panel 62 and right panel 64 having generally identical outer contours. In other words, the airbag 46 can be manufactured simply with a planar jointing work. Therefore, in a simple fashion without a complicated three-dimensional jointing work, the airbag 46 can be manufactured such that the protection inflatable region 54 inflates thicker than the mounting region 47 and intermediate region 51.

Also in the airbag 46 of the third embodiment, the protection inflatable region 54 for protecting an occupant MP is inflatable thick whereas other intermediate region 51 and mounting region 47 are inflatable thinner relatively. This configuration of the airbag 46 will contribute to reduce the volume of the airbag while maintaining an adequate occupant protection property of the airbag, and further help reduce the output of an inflator for feeding an inflation gas to the airbag 46.

The airbag 46 of the third embodiment is formed by jointing the outer peripheries 62b and 64b of the left panel 62 and right panel 64 which are opposed to each other in a left and right direction, and the creases C6, C7, C8 and C9 forming the folded region 57 extend generally along an up and down direction. Moreover, in a similar fashion to the airbags 15 and 42 in the first and second embodiments, the airbag 46 of the third embodiment includes in the folded region 57 two outfold regions (i.e., the left outfold region 59 and right outfold region 60) and one infold region 58. At airbag deployment, the left outfold region 59 and right outfold region 60 will not protrude rearward (i.e., toward an occupant MP) in such a manner as to pull away from the mounting region 47, but will unfurl toward the left (i.e., toward an outside of the left panel 62) and right (i.e., toward an outside of the right panel 64) considerably. Further, since the leading end 58a of the infold region 58 is coupled to the intermediate region 51 with the extended region 52a of the seam region 52, the airbag 46 will be prevented from protruding rearward (i.e., toward the occupant MP) while letting the left panel 62 and right panel 64 pull apart from each other at deployment. The extended region 52a of the seam region 52 is elongated in an up and down direction and couples an extensive area in an up and down direction of the leading end 58a of the infold region 58 to the intermediate region 51. This configuration will form a recessed portion 55a, which is sunken forward and extends generally in an up and down direction over a generally entire area of the occupant protection plane 55, at a generally center in a left and right direction of the occupant protection plane 55 at airbag deployment. On the left side and right side of the recessed portion 55a, there will be formed two raised portions 55b which protrude relatively toward the occupant MP (i.e., rearward) and are inflatable widely in a left and right direction (FIG. 24), due to inflation of the left outfold region 59 and right outfold region 60. Therefore, the airbag 46 will cover the front side of the occupant widely in a left and right direction while having the recessed portion at the center in a left and right direction at deployment. As indicated by double-dotted lines in FIG. 24, the airbag 46 will be able to receive the head MH of the occupant MP, which moves forward, by the recessed portion 55a disposed at the center in a left and right direction of the occupant protection plane 55 and catch the shoulders MS by the raised portions 55b, thus protecting the occupant MP smoothly by receiving the head MH softly and restraining the shoulders MS adequately.

The fourth embodiment of the invention is now described. An airbag 110 of the fourth embodiment is adapted to be used in an airbag device S4 for knee protection.

Figure 25:
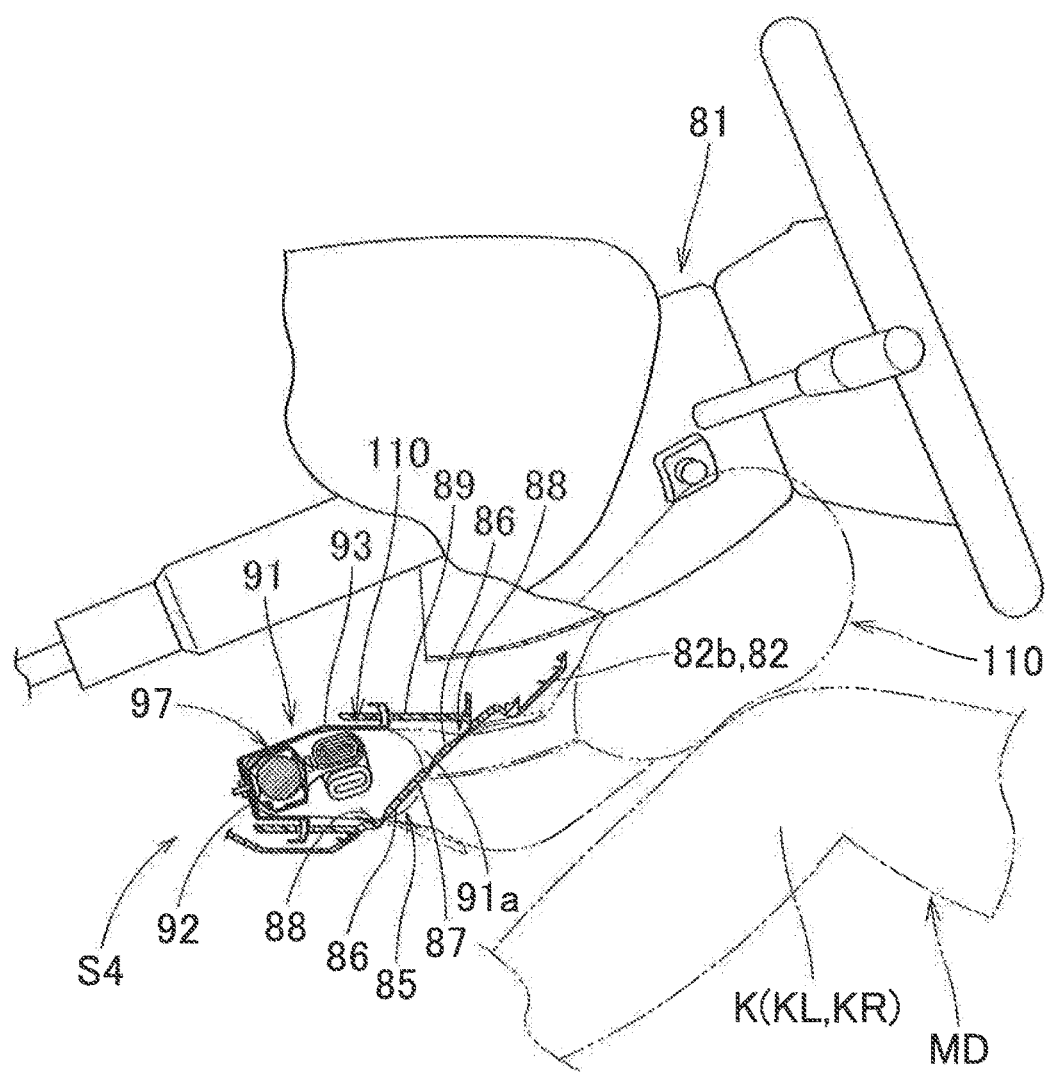
FIG. 25 is a schematic vertical section of an airbag device for knee protection employing an airbag according to the fourth embodiment of the invention as mounted on a vehicle.
Figure 27:
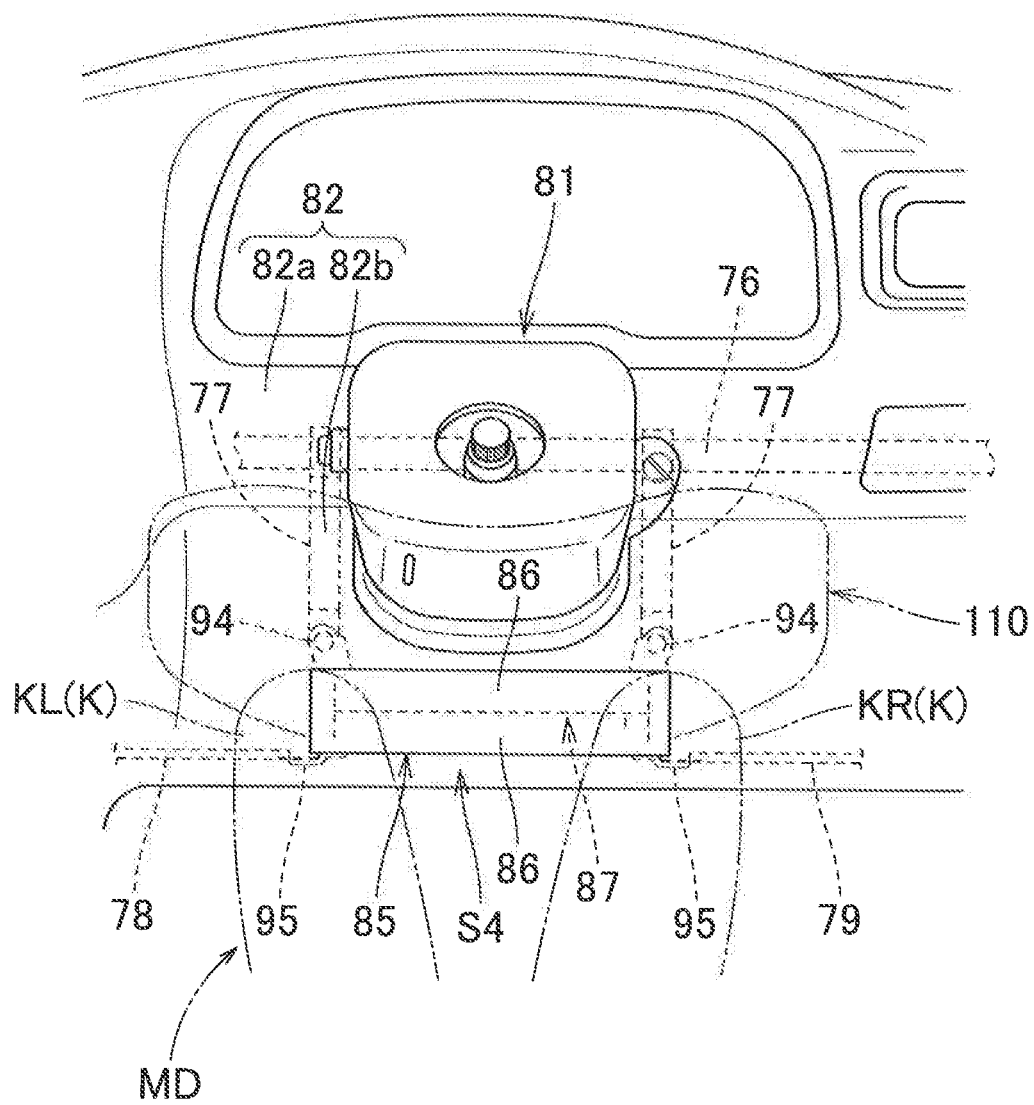
FIG. 27 is a schematic front view of the airbag device of knee protection of FIG. 25 in service as viewed from the rear.

As shown in FIGS. 25 and 27, the airbag device S4 for knee protection is mounted at a lower side of a steering column 81 in front of a driver's seat for protecting knees K (KL and KR) of a driver (occupant) MD as an object of protection.

Figure 26:
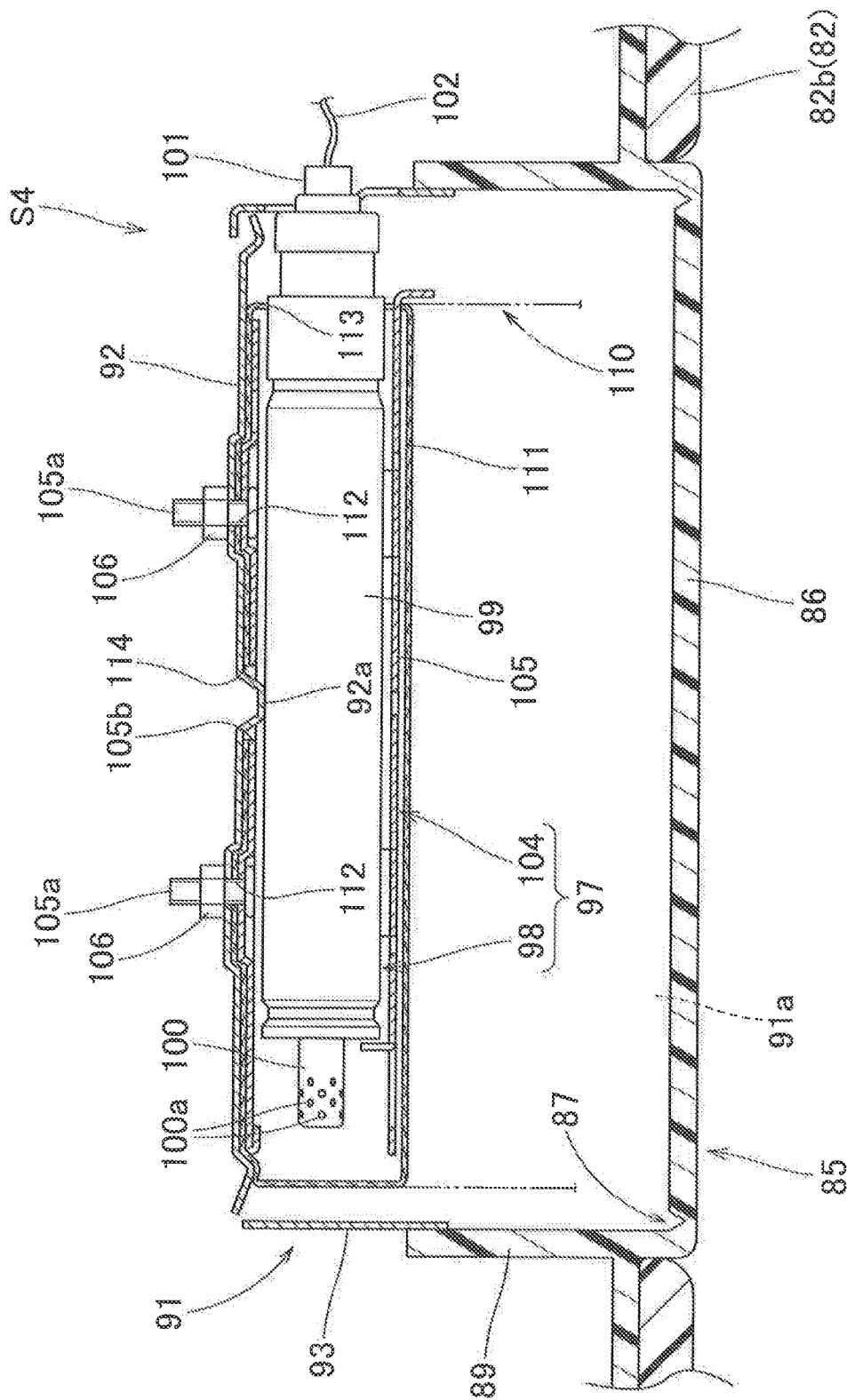
FIG. 26 is a schematic horizontal section of the airbag device for knee protection of FIG. 25.

As shown in FIGS. 25 and 26, the airbag device S4 includes an airbag 110, which is folded up, an inflator 97 for feeding inflation gas to the airbag 110, a case or housing 91 for housing the airbag 110 and inflator 97 and an airbag cover 85 for covering the rear side of the airbag 110.

The airbag cover 85 is fabricated from thermoplastic elastomer of polyolefin for covering an opening 91a disposed at the rear of the case 91. As shown in FIG. 25, the airbag cover 85 is disposed on a lower panel 82b of the dashboard 82 which is composed of an upper panel 82a and lower panel 82b. The airbag cover 85 includes doors 86 for covering the opening 91a of the case 91 and a joint wall 89 extending forward from the periphery of the doors 86 for joint with a circumferential wall 93 of the case 91. As shown in FIG. 27, the doors 86 are provided, in the peripheral area, with a thinned tearable portion 87 formed into a generally H as viewed from the rear. At the upper end and lower end of the doors 86 are hinge sections 88 about which the doors 86 open upward and downward.

As shown in FIGS. 25 and 26, the case 91 is made of sheet metal and includes a bottom wall 92 which is disposed at the front side and formed into a generally square, a circumferential wall 93 extending rearward from the periphery of the bottom wall 92 in a generally square tubular shape, and an opening 91a disposed at the rear. The bottom wall 92 includes insert holes (reference numeral omitted) for receiving bolts 105a of a later-described retainer 104 of the inflator 97. The bottom wall 92 further includes a projection 92a protruding rearward for abutment against an outer circumferential plane of a later-described main body 99 of the inflator body 98 (FIG. 26). The circumferential wall 93 includes hooks (reference numeral omitted) for retaining the joint wall 89 of the airbag cover 85 and mounting brackets 94 and 95 for mounting the case 91 on a vehicle body structure. As shown in FIG. 27, the mounting brackets 94 disposed at the upper side are jointed to brackets 77 extending from a dashboard reinforcement of the vehicle body structure, and the mounting brackets 95 disposed at the lower side are jointed to brackets 78 and 79 extending from a center brace or a front body pillar (not shown) of the vehicle body structure.

As shown in FIGS. 25 and 26, the inflator 97 includes a generally columnar body 98 and a retainer 104 for holding the body 98.

The inflator body 98 is generally columnar in shape and is so mounted on board that its axial direction extends along a left and right direction. The body 98 includes a main body 99 with a large diameter and a gas discharge section 100 that has a small diameter and projects out of the first end in a left and right direction (the left end, in the illustrated embodiment) of the main body 99. The gas discharge section 100 is provided with numerous gas discharge ports 100*a* for discharging inflation gas. A connector 101, which is connected to a lead wire 102 for feeding an actuating signal, is mounted on the second end (i.e., the right end) of the main body 99.

The retainer 104 includes a generally tubular holding portion 105 made of sheet metal and two bolts 105*a* projecting out of the holding portion 105 generally orthogonally to the axial direction of the holding portion 105. In the airbag device S4 of the fourth embodiment, the inflator body 98 as is set in the holding portion 105 of the retainer 104 is put inside the airbag 110 such that the bolts 105*a* of the retainer 104 project out of later-described insert holes 112 of the airbag 110. Then the inflator 97 as is housed inside the airbag 110 is set in the case 17 such that the bolts 105*a* project out of the bottom wall 92 of the case 91 for nut 106 fixing. Thus the inflator 97 and airbag 110 are mounted on the case 91.

Figure 28:
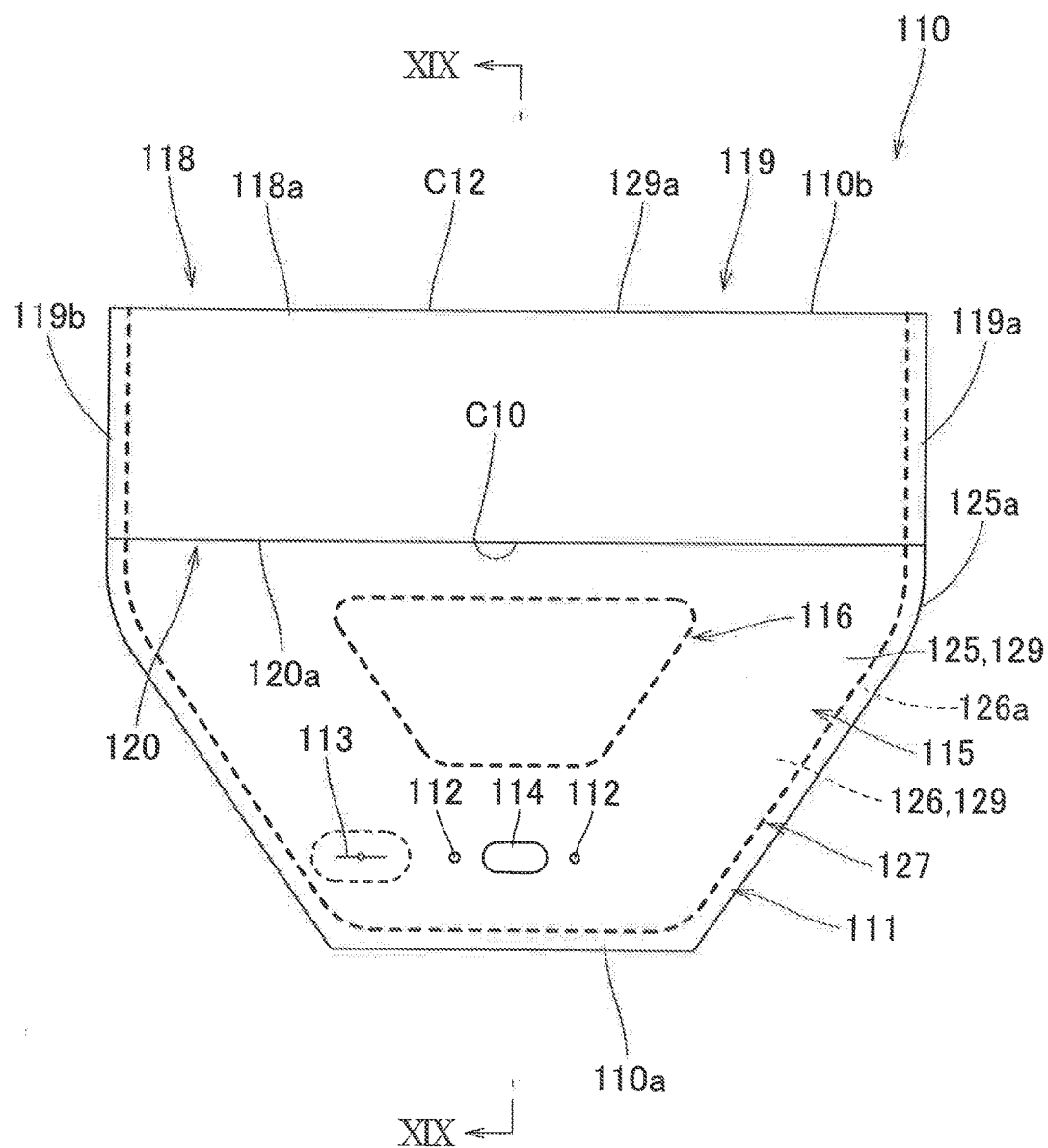
FIG. 28 is a plan view of the airbag of the fourth embodiment as flattened and spread out such that an upper panel and a lower panel overlap each other.
Figure 30:
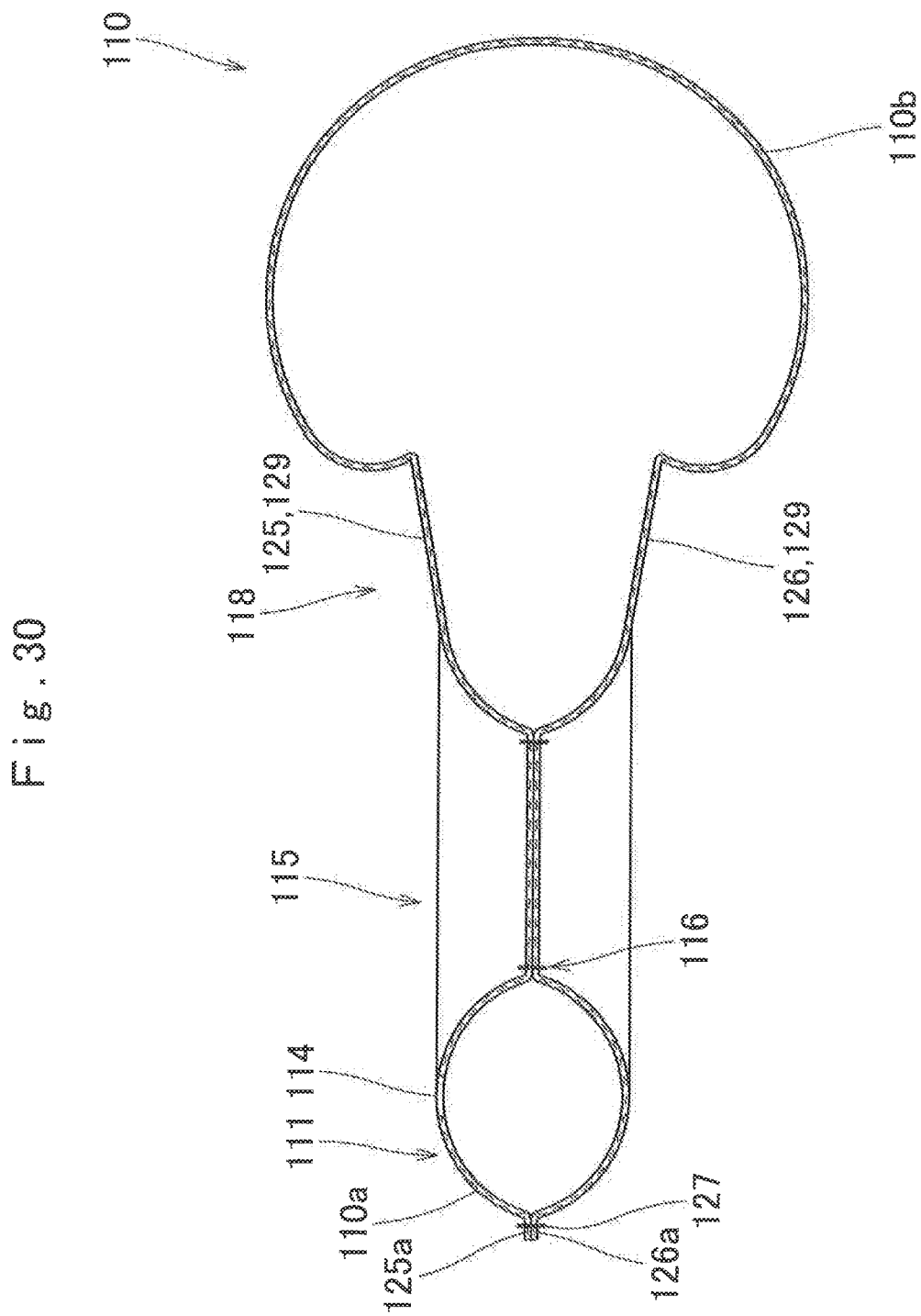
FIG. 30 is a schematic vertical section of the airbag of the fourth embodiment as inflated by itself.

As shown in FIGS. 28 and 30, the airbag 110 includes a mounting region 111 that is located at the front end 110*a* of the airbag 110 at deployment and secured to the case 91, a protection inflatable region 118 that is deployable at the leading end (i.e., at the rear end 110*b*) apart from the case 91 and towards an occupant, and an intermediate region 115 that is disposed between the mounting region 111 and protection inflatable region 118.

As shown in FIGS. 25 and 27 (see double-dotted lines), the airbag 110 is deployable into a generally rectangular board. The mounting region 11 stays inside the case 91 at airbag deployment and has a small width in a left and right direction. The protection inflatable region 118 has a great width in a left and right direction for protecting knees K (KL and KR) of a driver (occupant) MD. More specifically, referring to FIG. 28, the airbag 110 as is flattened and spread out has such an outer contour that the width is smallest at the front end 110*a* in the mounting region 111 and enlarges towards the intermediate region 115, and then remains uniform in the protection inflatable region 118. The mounting region 111 includes on the top side at deployment (i.e, on a later-described upper panel 125) two insert holes 112 for receiving the bolts 105*a* of the retainer 104, a slit 113 for inserting the inflator 97 (i.e., the inflator body 98 with the retainer 104) and an opening 114 for receiving the projection 92*a* formed on the bottom wall 92 of the case 91.

Figure 31:
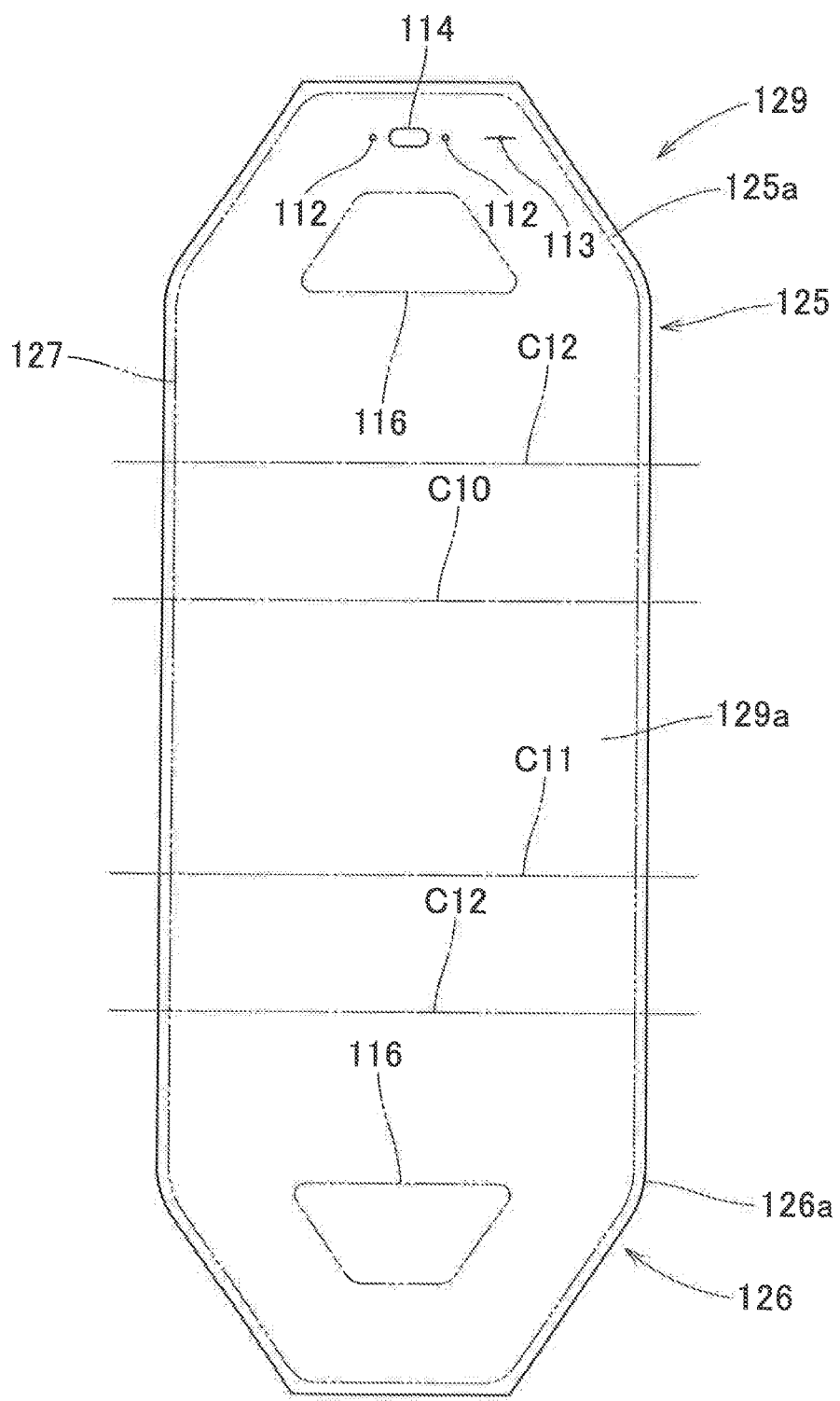
FIG. 31 is a plan view of a base material forming the airbag of the fourth embodiment.

The airbag 110 is formed into a bag by sewing (jointing) together an outer periphery 126*a* of a lower panel 126, which is deployable at the underside (i.e., towards a driver MD), and an outer periphery 125*a* of an upper panel 125, which is deployable at the upper side (i.e., towards a steering column 81), with sewing threads. The lower panel 126 and upper panel 125 are identical in outer contour. More specifically, the lower panel 126 and upper panel 125 are composed of such a one-piece base material 129 shown in FIG. 31 that the lower panel 126 and upper panel 125 are continuous at the leading ends apart from the mounting region 111. The airbag 110 is formed into a bag by sewing (jointing) together the outer peripheries 126*a* and 125*a* of the lower panel 126 and the upper panel 125 as overlaid one above the other with sewing threads. As shown in FIG. 28, an outer contour of the airbag 110 provided with a later-described folded region 119, in such a flattened and spread out state that the upper panel 125 and lower panel 126 overlap each other, is such a generally trapezoid that enlarges towards the protection inflatable region 118 (towards the rear end 110*b*) from the narrow leading end of the mounting region 111 (i.e., from the front end 110*a*). A sewn region (joint) 127 that sews (joints) the outer peripheries 126*a* and 125*a* of the lower panel 126 and the upper panel 125 is formed along an entire periphery of the airbag 110 except a vicinity of a joint region 129*a* (i.e., the rear end of the airbag 110 at deployment) at which the lower panel 126 and the upper panel 125 are continuous, as shown in FIG. 28. The base material 129 is composed of a flexible woven fabric of polyester yarn, polyamide yarn or the like.

Figure 29:
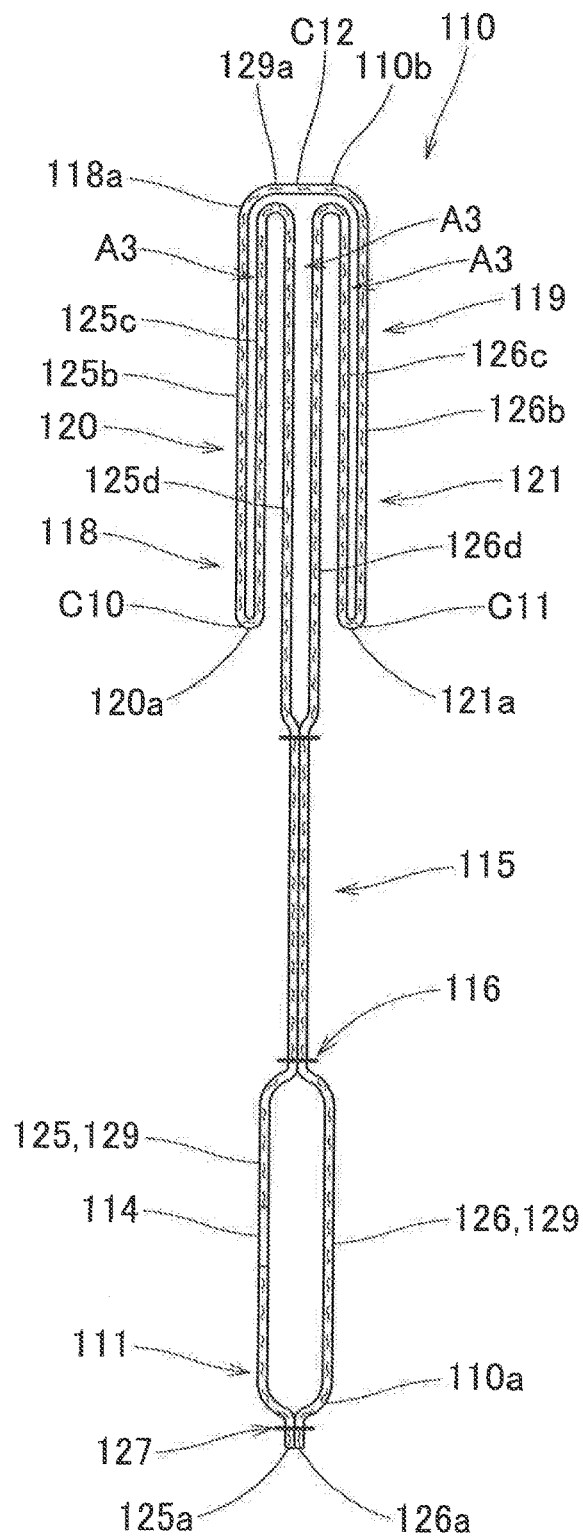
FIG. 29 is an enlarged sectional view taken along line XIX-XIX of FIG. 28.

As shown in FIGS. 29 and 30, the intermediate region 115 includes a seam region 116 that partially connects the upper panel 125 and lower panel 126 in such a manner as to bring the panels 125 and 126 into contact with each other. In the illustrated embodiment, the seam region 116 is formed by sewing the upper panel 125 and lower panel 126 together with sewing threads. As shown in FIG. 28, the seam region 116 is formed into such a generally trapezoid that enlarges toward the protection inflatable region 118 and locates the base towards the protection inflatable region 118, when the airbag 110 so flattened and spread out that the upper panel 125 and lower panel 126 are laid one over the other is viewed from an up and down direction. Corners of the seam region 116 are chamfered and rounded in order to avoid stress concentration upon airbag deployment.

The protection inflatable region 118 includes at the leading end 118*a*, which is apart from the mounting region 111, a folded region 119 that is formed by bringing a leading end region of the base material 129 in a two-fold state, in which the upper panel 125 and lower panel 126 are flattened and spread out in an overlapping state, closer to the mounting region 111 in such a manner as to reduce the length of the airbag 110. That is, the folded region 119 is formed by bringing the joint region 129*a*, at which the upper panel 125 and lower panel 126 are continuous, closer to the mounting region 111.

In a state where the upper panel 125 and lower panel 126 are spread out and overlap with each other, in other words, in a sectional shape of the airbag 110 taken along an overlapping direction of the upper panel 125 and lower panel 126 (i.e., taken along an up and down direction) as shown in FIG. 29, the folded region 119 includes two outfold regions; an upper outfold region 120 and a lower outfold region 121 overlaid one on the other in an up and down direction. The upper outfold region 120 has a two-ply structure and is disposed on an outside (or on an upper side) of the upper panel 125 such that the leading end 120*a* is directed towards the mounting region 111. Likewise, the lower outfold region 121 has a two-ply structure and is disposed on an outside (or at an underside) of the lower panel 126 such that the leading end 121*a* is directed towards the mounting region 111. In the illustrated embodiment, the upper outfold region 120 and lower outfold region 121 are symmetrical in an up and down direction.

That is, in a sectional shape of the airbag 110 taken along an overlapping direction of the upper panel 125 and lower panel 126 (i.e., taken along an up and down direction), the folded region 119 has three layers (namely, a first layer 125b, a second layer 125c and a third layer 125d) of the upper panel 125 on the border between the upper panel 125 and lower panel 126 (i.e., on the joint region 129a) while having three layers (namely, a first layer 126b, a second layer 126c and a third layer 126d) of the lower panel 126 beneath the joint region 129a, as shown in FIG. 29. Further, the folded region 119 is so configured that an inflatable space A3, which is inflatable with inflation gas, is provided at three regions between the opposing layers of the upper panel 125 and lower panel 126, i.e., between the first layer 125b and second layer 125c of the upper panel 125, between the third layer 125d of the upper panel 125 and the third layer 126d of the lower panel 126, and between the first layer 126b and second layer 126c of the lower panel 126. Moreover, each of later-described creases C10, C11 and C12 forming the folded region 119 continues to the sewn region (joint) 127 that joints or sews the outer peripheries 125a and 126a of the upper panel 125 and the lower panel 126, as shown in FIG. 28. That is, in the airbag 110, the sewn region 127, which sews (joints) the outer peripheries 125a and 126a of the upper panel 125 and lower panel 126 together, is formed in the folded region 119 as well as in the mounting region 111 and intermediate region 115. In other words, the edges 119a and 119b in a left and right direction of the folded region 119 are jointed together by the sewn region 127 in a state where the upper panel 125 and lower panel 126 are folded up.

Figure 32A:
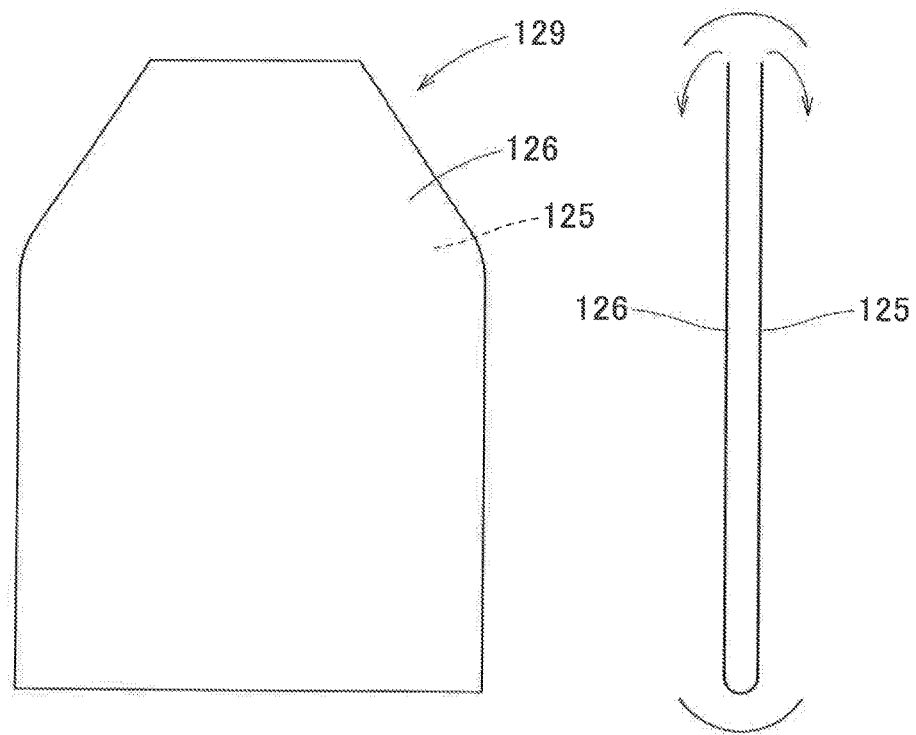
FIGS. 32A, 32B, 33A and 33B schematically illustrate the manufacturing process of the airbag of the fourth embodiment.
Figure 32B:
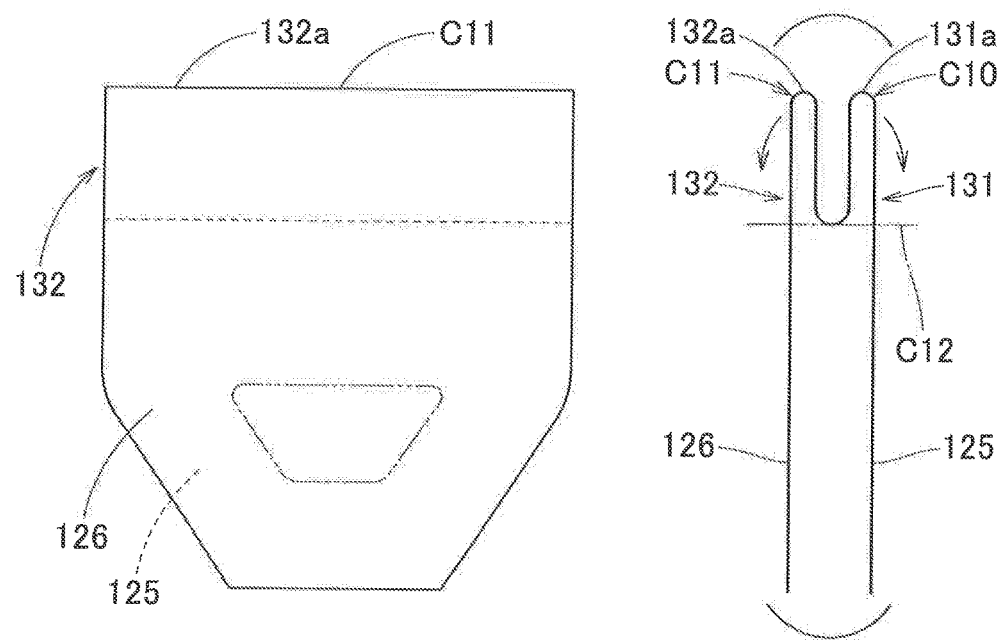
Figure 33A:
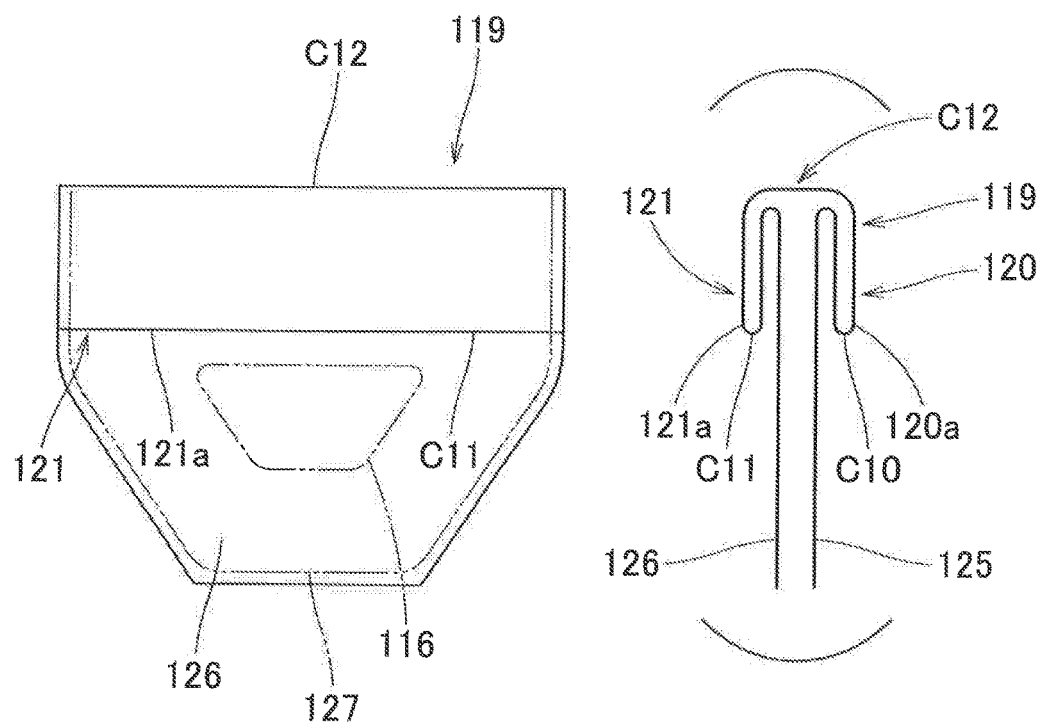
Figure 33B:
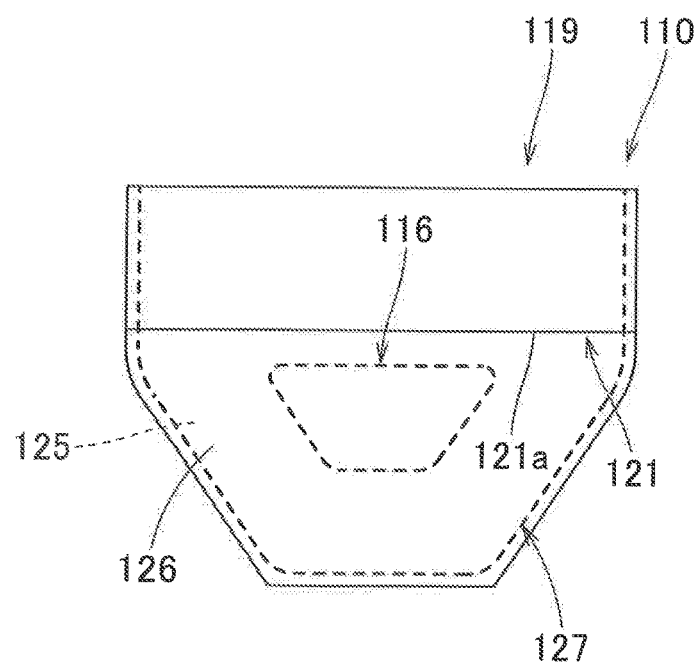

Manufacturing of the airbag 110 of the fourth embodiment is now described. The base material 129 is provided in advance with the insert holes 112, the slit 113 and opening 114. Then firstly, as shown in FIG. 32A, the base material 129 is doubled such that the outer surface at airbag deployment faces in. Then as shown in FIG. 32B, in the doubled base material 129, each of the regions of the upper panel 125 and lower panel 126 towards the mounting region 111 is folded back on the crease C10/C11 so the outer surface at airbag deployment faces outwardly, thus providing an upper outfold constituent portion 131 and a lower outfold constituent portion 132, which are generally symmetrical in an up and down direction. At this time, the upper panel 125 and lower panel 126 are so arranged that their outer circumferential edges in the mounting region 111 align with each other. Regions in the vicinities of the creases C10 and C11 are to form the leading ends 131a and 132a of the upper outfold constituent portion 131 and lower outfold constituent portion 132 as well as the leading ends 120a and 121a of the upper outfold region 120 and lower outfold region 121. Thereafter, the upper outfold constituent portion 131 and lower outfold constituent portion 132 are folded back on the crease C12 such that regions around the creases C10 and C11 (i.e., the leading ends 131a and 132a) are brought towards the mounting region 111 and the crease that doubled the base material 129 is undone, thereby providing the upper outfold region 120 and lower outfold region 121, which are generally symmetrical in an up and down direction. Thus the folded region 119 is formed at the leading end 118a of the protection inflatable region 118 as shown in FIG. 33A. Then the outer peripheries 125a and 126a of the upper panel 125 and lower panel 126 in a folded-up state are sewn together with sewing threads all over including the opposite edges 119a and 119b in a left and right direction of the folded region 119, thus forming the sewn region (or joint) 127. Then if the seam region 116 is formed by bringing the upper panel 125 and lower panel 126 in the intermediate region 115 into contact with each other and sewing the panels 125 and 126 together with sewing threads, the airbag 110 is completed as shown in FIG. 33B.

When the airbag 110 is completed, the retainer 104 is housed inside the airbag 110 via the slit 113 such that the bolts 105a project out of the insert holes 112, and then the airbag 110 is folded up. The airbag 110 is then wrapped up by a tearable wrapping sheet (not shown) for keeping the folded-up configuration. Then the inflator body 98 is inserted into the airbag 110 via the slit 113 and set in the holding portion 105 of the retainer 104. Subsequently, the airbag 110 and inflator 97 are set in the case 91 such that the bolts 105a project out of the bottom wall 92 and are then fastened with nuts 106. Thus the airbag 110 and the inflator 97 are mounted on the case 91. If then the airbag cover 85 is mounted on the case 91, an airbag module is provided. The airbag module is mounted on the vehicle body structure with the aid of the brackets 77, 78 and 79, and the connector 101 connected with the lead wire 102 extending from an airbag actuation circuit is connected to the inflator 97. The airbag device S4 for knee protection is mounted on the vehicle if the dashboard 82 and an undercover (reference numeral omitted) are mounted.

After the airbag device S4 is mounted on the vehicle, if an actuating signal is fed to the inflator 97 via the lead wire 102, an inflation gas is discharged from the gas discharge ports 100a and flows into the airbag 110. Then the airbag 110 inflates and breaks the wrapping member, pushes the doors 86 of the airbag cover 85, and breaks the breakable portion 87 so that the doors 86 open upward and downward around the hinge portions 88. Thus the airbag 110 emerges from the opening 91a of the case 91 and deploys rearward as shown in FIGS. 25, 27 (double-dotted lines) and 34.

When the airbag 110 is fed with an inflation gas G, the protection inflatable region 118 will inflate while unfolding the creases in the folded region 119 in such a manner as to inflate the three inflatable spaces A3. Since the folded region 119 includes the creases C10, C11 and C12 which continue to the sewn region (joint) 127 formed at the opposite edges 119a and 119b in a left and right direction, when fed with an inflation gas G, the protection inflatable region 118 will inflate in a thick fashion in such a manner as to unfold and open up the folded region 119 with the opposite edges 119a and 119b regulated by the sewn region 127. Moreover, in the airbag 110, since the protection inflatable region 118 has a greater substantial film length in a direction perpendicular to the creases C10, C11 and C12 of the folded region 119 (i.e., in a direction along which the mounting region 111 and protection inflatable region 118 are disposed, i.e., in a front and rear direction) than the mounting region 111 and intermediate region 115 by the amount of the folded region 119, the protection inflatable region 118 will inflate thicker than the mounting region 111 and intermediate region 115. Further, the airbag 110 can be manufactured simply by jointing the outer peripheries 125a and 126a of the upper panel 125 and lower panel 126 having generally identical outer contours. In other words, the airbag 110 can be manufactured simply with a planar jointing work. Therefore, in a simple fashion without a complicated three-dimensional jointing work, the airbag 110 can be manufactured such that the protection inflatable region 118 inflates thicker than the mounting region 111 and intermediate region 115.

Figure 34:
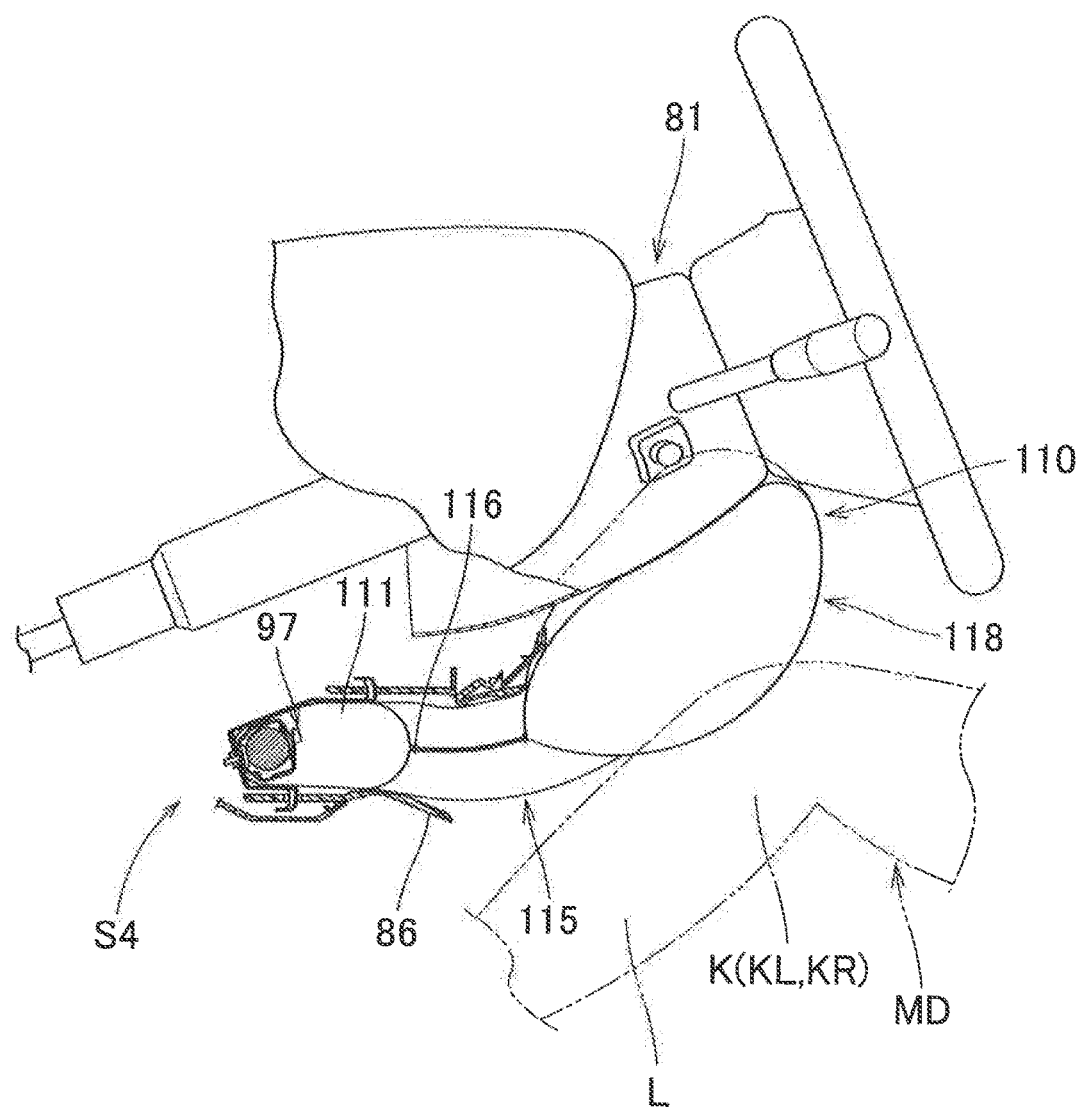
FIG. 34 is a schematic vertical section of the airbag device for knee protection employing the airbag of the fourth embodiment as fully deployed.

Moreover, the airbag 110 of the fourth embodiment includes in the intermediate region 115 the seam region 116 that partially connects the upper panel 125 and lower panel 126 in such a manner as to bring the panels 125 and 126 into contact with each other. As shown in FIG. 34, the intermediate region 115 will be deployable in front of shins L of a driver (an occupant) MD at airbag deployment. Locating the seam region 116 in this region will help thin the intermediate region 115 at airbag deployment and prevent the airbag 110 from pushing the shins L in an undue fashion. When a space between the driver MD and steering column 81 is small, this configuration will also help deploy the airbag 110 smoothly in the small space. Since the protection inflatable region 118 deployable in front of knees K (KL and KR) of the driver MD includes the folded region 119 and is configured to inflate thick, the protection inflatable region 118 will protect the knees K in an adequate fashion. Furthermore, the airbag 110 includes in the folded region 119 no infold region but two outfold regions 120 and 121 only. When the protection inflatable region 118 inflates and unfolds the folded region 119, this configuration will help prevent the protection inflatable region 118 from protruding considerably rearward (i.e., in a direction heading from the mounting region 111 towards the protection inflatable region 118) and deploy the protection inflatable region 118 thick in a direction orthogonal to the protruding direction, i.e., in an up and down direction, as shown in FIG. 30. Therefore, the airbag 110 will be capable of deploying the protection inflatable region 118 between the knees K of the driver MD and steering column 81 quickly while preventing it from protruding toward the driver MD unduly, thus protecting the knees K quickly by the protection inflatable region 118. The airbag for knee protection may also include an infold region, provided that the infold region is coupled to the intermediate region by an extended region of the seam region.

In the airbags 15, 42, 46 and 110 of the foregoing embodiments, the seam regions 21, 43, 52 and 116 connect the panels in such a manner as to bring the panels into plane contact with each other in a generally triangular shape or in a generally trapezoidal shape. However, the shape of the seam region should not be limited thereby. One or more seam regions may be provided in a rectangular shape, in a round shape, or in an oval shape. Alternatively, the seam region may be formed into a line or a plurality of lines connecting the panels linearly.

Figure 35A:
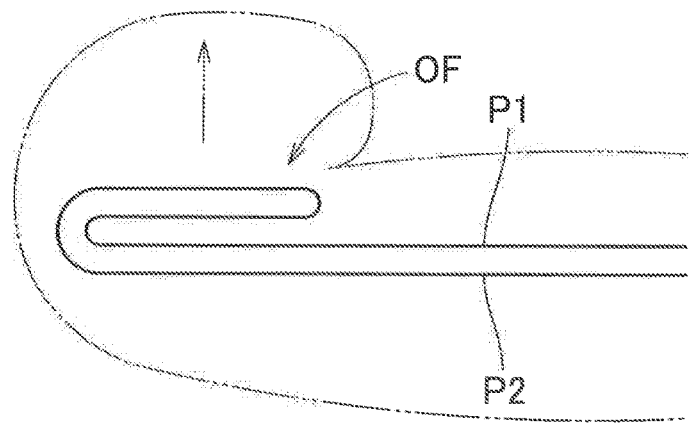
FIGS. 35A and 35B schematically illustrate modified forms of the invention.
Figure 35B:
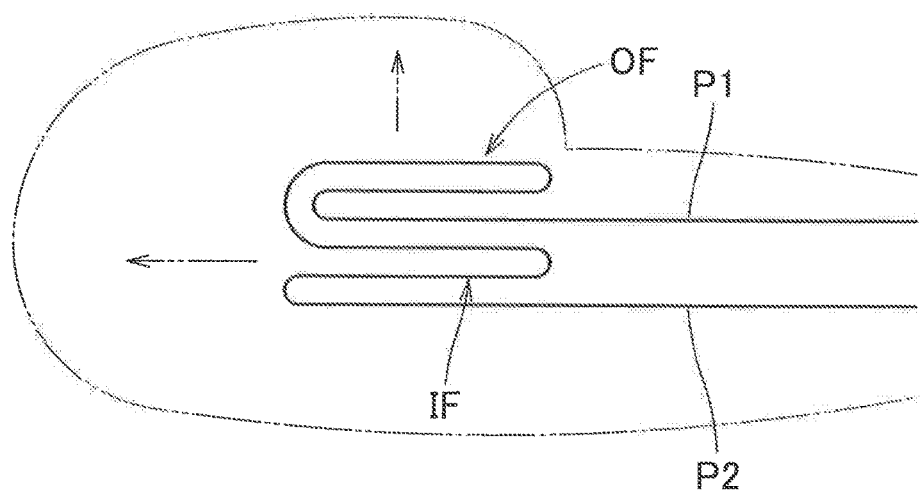
Figure 36A:
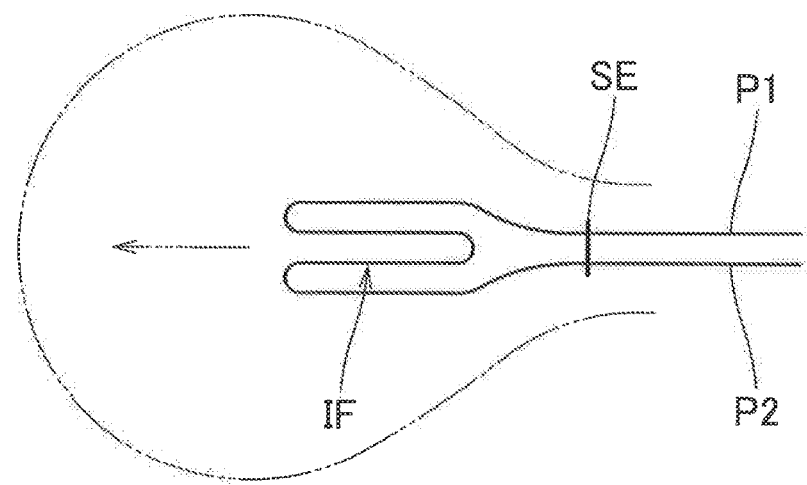
FIGS. 36A and 36B schematically illustrate further modified forms of the invention.
Figure 36B:
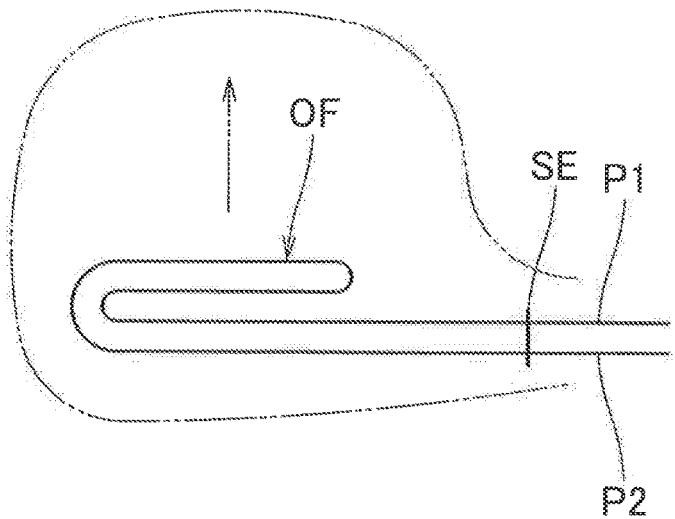

It will also be understood that the airbag may include no seam region in the intermediate region. The configuration of the folded region may be arbitrary decided even in such an instance. FIGS. 35A and 35B schematically depict examples of instances where the airbag includes no such seam region that connects the panels P1 and P2. FIG. 35A shows an instance where a protection inflatable region of an airbag includes only one outfold region OF on a side of the panel P1. With this configuration, the protection inflatable region will inflate thick at a side of the panel P1 while unfolding the outfold region OF. This configuration will be suitable for an airbag for knee protection. FIG. 35B shows an instance where one outfold region OF is provided at a side of the panel P1 while one infold region IF is provided between the panels P1 and P2. With this configuration, the protection inflatable region will inflate thick at a side of the panel P1 by unfolding the outfold region OF while protruding towards an object of protection by unfolding the infold region IF and pulling the panels P1 and P2 away from each other. An airbag with no infold region such as one shown in FIG. 35A will be prevented from protruding towards an object of protection. FIGS. 36A and 36B schematically depict examples of instances where the airbag includes a seam region SE. The configuration of the folded region may be arbitrary decided also in such instances. FIG. 36A shows an instance where the airbag includes a seam region SE and an infold region IF between the panels P1 and P2. With this configuration, the protection inflatable region will pull the panels P1 and P2 away from each other and inflate in such a manner as to protrude in a direction away from the mounting region while the region around the seam region SE is kept from inflating. FIG. 36B shows an instance where the airbag includes a seam region SE and an outfold region OF at a side of the panel P1. With this configuration, the protection inflatable region will inflate thick at a side of the panel P1 without protruding considerably toward a direction away from the mounting region while the region around the seam region SE is kept from inflating. Thus, the contour of the protection inflatable region of the airbag at deployment can be arbitrarily controlled depending on the arrangement of outfold region(s) and infold region(s), in combination with the presence or absence of the seam region.

The airbags in the foregoing embodiments have been described as used in an airbag device for a front passenger seat or for knee protection. However, the application of the airbag of the invention should not be limited thereby. The present invention may also be applied, by way of example, to an airbag for a side airbag device which is adapted to be stored inside a seatback of a vehicle seat for covering a side of an occupant (i.e., an object of protection) seated in the seat, or to an airbag for pedestrian protection which is adapted to be stored at the rear end region of a vehicle hood for deploying the airbag over the front side of a front pillar or the upper surface of the rear end region of the hood for protecting a pedestrian (i.e., an object of protection).

What is claimed is:

1. An airbag which is inflatable with inflation gas and adapted to be housed in a housing in a folded-up configuration, the airbag comprising:
   a mounting region adapted to be attached to the housing;
   a protection inflatable region disposed at a leading end of the airbag apart from the mounting region and being deployable towards an object of protection;
   an intermediate region disposed between the mounting region and the protection inflatable region, the intermediate region including a seam region that partially connects two panels and brings the two panels into contact with each other;
   the two panels form at least an area of the airbag from the protection inflatable region to the intermediate region, the two panels having a two-fold arrangement providing two layers of base material, and the two panels being continuous with each other at leading end regions of the panels apart from the mounting region;
   a folded region that is disposed in the protection inflatable region, the folded region includes at least six overlapping layers of base material of the panels that are formed by folding each of the two panels on a crease in such a manner as to bring a leading end region of each of the two panels closer to the mounting region, and at least three inflatable spaces that are formed between the layers for inflation with the inflation gas, the folded region includes at least two outfold regions that are formed by placing the leading end regions of the two panels on an outside of the two panels; and
   a joint that connects together opposite edges of the two panels in the protection inflatable region and intermediate region as the folded region is formed, such that the joint is continuous with the crease.

2. The airbag of claim 1, wherein:
- the two panels are deployable one above the other at airbag deployment; and
- the two outfold regions are composed of an upper outfold region disposed on the panels and a lower outfold region disposed under the panels.

3. The airbag of claim 2 adapted to be used in an airbag device for knee protection.

4. The airbag of claim 3, wherein the intermediate region is deployable in front of shins of an occupant as the object of protection.

5. The airbag of claim 1, wherein:
- the two panels are deployable side by side in a left and right direction at airbag deployment; and
- the two outfold regions are composed of a left outfold region disposed on a left side of the panels and a right outfold region disposed on a right side of the panels.

6. The airbag of claim 1, wherein the folded region includes an infold region which is formed by invaginating the leading end regions of the two panels before forming the folded region between the two panels.

7. The airbag of claim 6, wherein the seam region includes an extended region that connects a part of the infold region to the two panels opposed to each other.

\* \* \* \* \*